(12) United States Patent
Remer

(10) Patent No.: US 12,019,205 B2
(45) Date of Patent: *Jun. 25, 2024

(54) MACRO-THREAT DETECTION USING SENSOR ARRAYS AND CONVEYORS

(71) Applicant: The Government of the United States of America, as represented by the Secretary of Homeland Security, Washington, DC (US)

(72) Inventor: James Henry Remer, Waterford Works, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,866

(22) Filed: Nov. 24, 2023

(65) Prior Publication Data

US 2024/0085585 A1 Mar. 14, 2024

Related U.S. Application Data

(63) Continuation of application No. 18/143,806, filed on May 5, 2023, now Pat. No. 11,860,333.

(Continued)

(51) Int. Cl.
*G01V 5/00* (2006.01)
*G01V 5/226* (2024.01)
(Continued)

(52) U.S. Cl.
CPC ............ *G01V 5/226* (2024.01); *G01V 7/04* (2013.01); *G06T 11/005* (2013.01)

(58) Field of Classification Search
CPC .......... G01N 23/046; G01N 2223/419; G01N 23/04; G01N 254/084; G01N 23/10;
(Continued)

(56) References Cited

U.S. PATENT DOCUMENTS 11,860,333 B2 * 1/2024 Remer ................ G06T 11/005
2019/0137651 A1 * 5/2019 Bendahan ................ G01V 5/22

OTHER PUBLICATIONS

Kirkendall, Barry, et al., "Imaging Cargo Containers Using Gravity Gradiometry", IEEE Transactions on Geoscience and Remote Sensing, vol. 45, No. 6, Jun. 2007.

(Continued)

*Primary Examiner* — Don K Wong
(74) *Attorney, Agent, or Firm* — Lavanya Ratnam; Robert W. Busby; Kelly G. Hyndman

(57) ABSTRACT

Examples are directed toward systems and methods relating to security screening. For example, a screening system includes a sensor array to sense a gravitational field caused by an item, and a conveyor to convey the item through sensing positions for scanning by the sensor array. A controller acquires weight measurement information from sensor elements, and gravitational measurement information from the sensor array. The conveyor incrementally advances the item through additional sensing positions to acquire weight measurement information and gravitational measurement information. The controller performs tomographic reconstruction to generate a tomographic image of the item, using a generated weight map as a static weight input vector and using a generated mass map as a static mass input vector for the tomographic reconstruction.

28 Claims, 8 Drawing Sheets

Related U.S. Application Data

(60) Provisional application No. 63/423,718, filed on Nov. 8, 2022, provisional application No. 63/338,766, filed on May 5, 2022.

(51) Int. Cl.
*G01V 7/04* (2006.01)
*G06T 11/00* (2006.01)

(58) Field of Classification Search
CPC ..... G01N 2223/643; G01N 2223/5015; G01N 2223/639; G01V 5/0008; G01V 5/005; G01V 5/0016; B65G 2201/0235; B65G 63/004; A61B 6/032; A61B 6/5205; A61B 6/027; A61B 6/037; A61B 6/025; A61B 6/03; A61B 6/482; A61B 6/5258; A61B 5/0073; A61B 6/4266; A61B 6/0407; A61B 8/463; A61B 6/4417; A61B 8/13; A61B 6/4007; A61B 6/486; A61B 8/4416; A61B 8/4494; A61B 2562/046; A61B 5/107; A61B 2/7275
See application file for complete search history.

(56) References Cited

OTHER PUBLICATIONS

Parmentola, John, "The Gravity Gradiometer as a Verification Tool", Science & Global Security, vol. 2, pp. 43-57, 1990.
Gauss's law for gravity, Wikipedia The Free Encyclopedia, https://en.wikipedia.org/wiki/Gauss%27s_law_for_gravity, accessed on Apr. 28, 2023.
Bell, R.E., Gravity Gradiometry, Scientific American, vol. 278, Jun. 1998, pp. 74.
Streland, A.H., Going Deep: A System Concept for Detecting Deeply Buried Facilities from Space, Air War College report, Feb. 2003.
Lee, James B., "Falcon gravity gradiometer technology", ASEG Extended Abstracts, Feb. 11, 2019, https://doi.org/10.1071/ASEG2001ab068.
Kirkendall, B. et al., "Imaging cargo containers using gravity gradiometry," Proceedings of SPIE, vol. 6204, May 2006.
Bell, C.C., et al., "Vibrational Mode Behavior of Rotating Cruciform Gravitational Gradient Sensors", Journal of Applied Physics, vol. 39, No. 7, Jun. 1968.
Difrancesco, D., "Advances and Challenges in the Development and Deployment of Gravity Gradiometer Systems", EGM 2007 International Workshop, Innovation in EM, Grav and Mag Methods: a new Perspective for Exploration, Capri, Italy, Apr. 15-18, 2007.
Yu, N., et al., "Development of an Atom-Interferometer Gravity Gradiometer for Gravity Measurement from Space". Applied Physics B, vol. 84, Issue 4, pp. 647-652, Jul. 18, 2006.

\* cited by examiner

MACRO-THREAT DETECTION USING SENSOR ARRAYS AND CONVEYORS

CROSS-REFERENCE TO RELATED APPLICATIONS

This application is a continuation of U.S. Nonprovisional patent application Ser. No. 18/143,806 entitled "Macro-Threat Detection Using Inertial Sensors and Gravitational Sensors," filed on May 5, 2023, which claims the benefit of priority to U.S. Provisional Application No. 63/423,718 entitled "Macro-Threat Detection Using Inertial Sensors and Gravitational Sensors," filed on Nov. 8, 2022, and claims the benefit of priority to U.S. Provisional Application No. 63/338,766 entitled "Macro-Threat Detection Using Inertial Sensors and Gravitational Sensors," filed on May 5, 2022, the contents of all of which are incorporated herein by reference in their entireties.

STATEMENT OF GOVERNMENT INTEREST

The claimed subject matter was made by one or more employees of the United States Department of Homeland Security in the performance of official duties. The Government has certain rights in the invention.

FIELD

The present subject matter relates generally to the field of security, and more specifically to the field of security screening.

BACKGROUND

Travel security screens for contraband or explosive threats that might be concealed in checked bags and cargo containers or pallets loaded for travel. Such screening, when it comes to smaller items, can be accomplished using planar or computed tomographic X-ray systems. Larger items are associated with various screening challenges. For example, large-scale shipments such as cargo are often highly dense and packed in large containers (LD3's and larger). Screening procedures for larger items are more costly, and can involve breaking down the shipments for screening or using expensive large-scale systems. Large-scale systems can employ highly hazardous and energetic ionizing radioactive sources. X-ray systems can suffer from false alarms, which are errors that incorrectly indicate the presence of a threat in a bag or piece of cargo being loaded. False alarms are costly and decrease throughput in screening systems.

SUMMARY

In an embodiment, a screening system includes a sensor array to sense a gravitational field caused by an item, and a conveyor to convey the item through sensing positions for scanning by the sensor array. The conveyor includes sensor elements. The screening system also includes a controller configured to direct the conveyor to advance the item through sensing positions for the sensor array. The controller acquires weight measurement information from the sensor elements corresponding to an absolute rest mass measurement of an item weight. The controller acquires gravitational measurement information from the sensor array corresponding to an absolute measurement of a gravitational field as affected by the item in the current sensing position. The conveyor incrementally advances the item through additional sensing positions to acquire weight measurement information and gravitational measurement information for remaining sensing positions. The controller generates a weight map of the item by processing the weight measurement information. The weight map is a weight measurement vector including a weight image across a surface of the item resolved to a sensor resolution of the plurality of sensor elements. The controller generates a mass map of the item by processing the gravitational measurement information. The mass map is a mass measurement vector including a mass image across a surface of the item resolved to a sensor resolution of the sensor array. The controller performs tomographic reconstruction to generate a tomographic image of the item, using the weight map as a static weight input vector and using the mass map as a static mass input vector for the tomographic reconstruction.

In another embodiment, a method for scanning an item includes directing, by a controller of a screening system, a conveyor of the screening system to advance an item to a sensing position for a sensor array of the screening system. The method acquires weight measurement information from sensor elements of the conveyor corresponding to an absolute rest mass measurement of an item weight. The method acquires gravitational measurement information from a sensor array corresponding to an absolute measurement of a gravitational field as affected by the item. The method incrementally advances the item and repeats, for additional sensing positions, acquiring weight measurement information and gravitational measurement information for remaining sensing positions. The method generates a weight map of the item by processing the weight measurement information, the weight map being a weight measurement vector including a weight image across a surface of the item resolved to a sensor resolution of the plurality of sensor elements. The method generates a mass map of the item by processing the gravitational measurement information, the mass map being a mass measurement vector including a mass image across a surface of the item resolved to a sensor resolution of the sensor array. The method performs tomographic reconstruction to generate a tomographic image of the item, using the weight map as a static weight input vector and using the mass map as a static mass input vector for the tomographic reconstruction.

In yet another embodiment, a screening system includes a conveyor including at least one roller and sensor elements actuatable to impart an impulse to the item. The conveyor is configured to convey the item through sensing positions for scanning by the sensor array. A controller directs the conveyor to advance the item to a current sensing position for the plurality of sensor elements. The controller actuates at least one sensor element to apply at least a portion of the impulse to the item. A sensor element imparts a force to a pixel mass element corresponding to a coordinate on a base surface of the item interacting with that sensor element. The controller acquires feedback information from the sensor elements for the current sensing position. The feedback information includes force information and displacement information corresponding to a return pulse from the item responsive to applying the impulse to the item. The controller incrementally advances the item and repeats, for additional sensing positions, acquiring feedback information. The controller generates a dynamic acceleration map and an inertial mass map of the item by processing the force information and displacement information for the sensing positions. The dynamic acceleration map is a dynamic acceleration measurement vector of the item. The inertial mass map is a dynamic acceleration measurement vector of the item, corresponding to a surface of the item interacting with the plurality of sensor elements. The controller performs tomographic reconstruction to generate the tomographic image of the item, using the dynamic acceleration map as a dynamic acceleration input vector and using the inertial mass map as an inertial mass input vector for the tomographic reconstruction.

In another embodiment, a screening system includes a sensor array to sense a gravitational field caused by an item. A conveyor includes a turntable to rotate the item through sensing positions for scanning by the sensor array. A controller directs the conveyor to rotate the item to a current sensing position for the sensor array. The controller acquires gravitational measurement information from the sensor array for the current sensing position. The gravitational measurement information corresponds to an absolute measurement of a gravitational field as affected by the item. The controller incrementally rotates the item and repeats acquiring gravitational measurement information for the sensing positions. The controller generates a mass map of the item by processing the gravitational measurement information, the mass map being a mass measurement vector including a mass image across a surface of the item resolved to a sensor resolution of the sensor array. The controller performs tomographic reconstruction to generate a tomographic image of the item, using the mass map as a static mass input vector for the tomographic reconstruction.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

One or more embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

Example systems and methods presented herein enable new techniques for screening large, highly dense, or cluttered target cargo or other shipments. Example systems and methods can be considered to provide "orthogonal" or "independent" screening modalities. Such orthogonal screening modalities can be performed in addition to existing X-ray screening modalities. An example "orthogonal" screening modality employs inertial movements and gravitational fields. The example modality uses inertial movements and gravitational fields to determine information regarding the makeup and consequent safety of baggage and cargo shipments. The example modality uses the information to screen baggage and cargo shipments, e.g., prior to their loading into transportation vehicles (aircraft, ship, truck, train or other) that are employed in the cargo or personnel chain of supply or movement.

Example systems and methods can involve sensing an attraction between the cargo item's components and a "witness" mass in an accelerometer-like sensor array, also referred to as an array of gravimeter or gravity gradiometer sensors. Such sensors have become increasingly more sensitive and accurate over time, in part due to their declassification as a means of underwater nuclear ballistic submarine navigation, their mass production, and their employment in portable electronic devices such as smartphones.

A concept underlying operation of embodiments of the system is the ability to sense absolute values (magnitude and direction) or changes in values (gravitational gradient) in, e.g., gravitational field tensors. The gravitational field tensor is caused by an item such as a shipping container and its contents that are subjected to inspection or security screening. The absolute value of the measured forces corresponds to a force directly measured, which can be affected by mechanical noise or other gravitational sources that the sensor can pick up as small contributions to the total detected gravitational field. Embodiments can eliminate the effects of such noise or other unwanted contributions by sensing changes in values. In an embodiment, the system uses a derivative function to sense a gravitational gradient, and determine how the gravitational field changes over time by sensing differential values. Such approaches enable the embodiments to remove or disregard the noise etc., and improve performance by enabling the embodiments to more accurately sense relatively smaller values.

Figure 1:
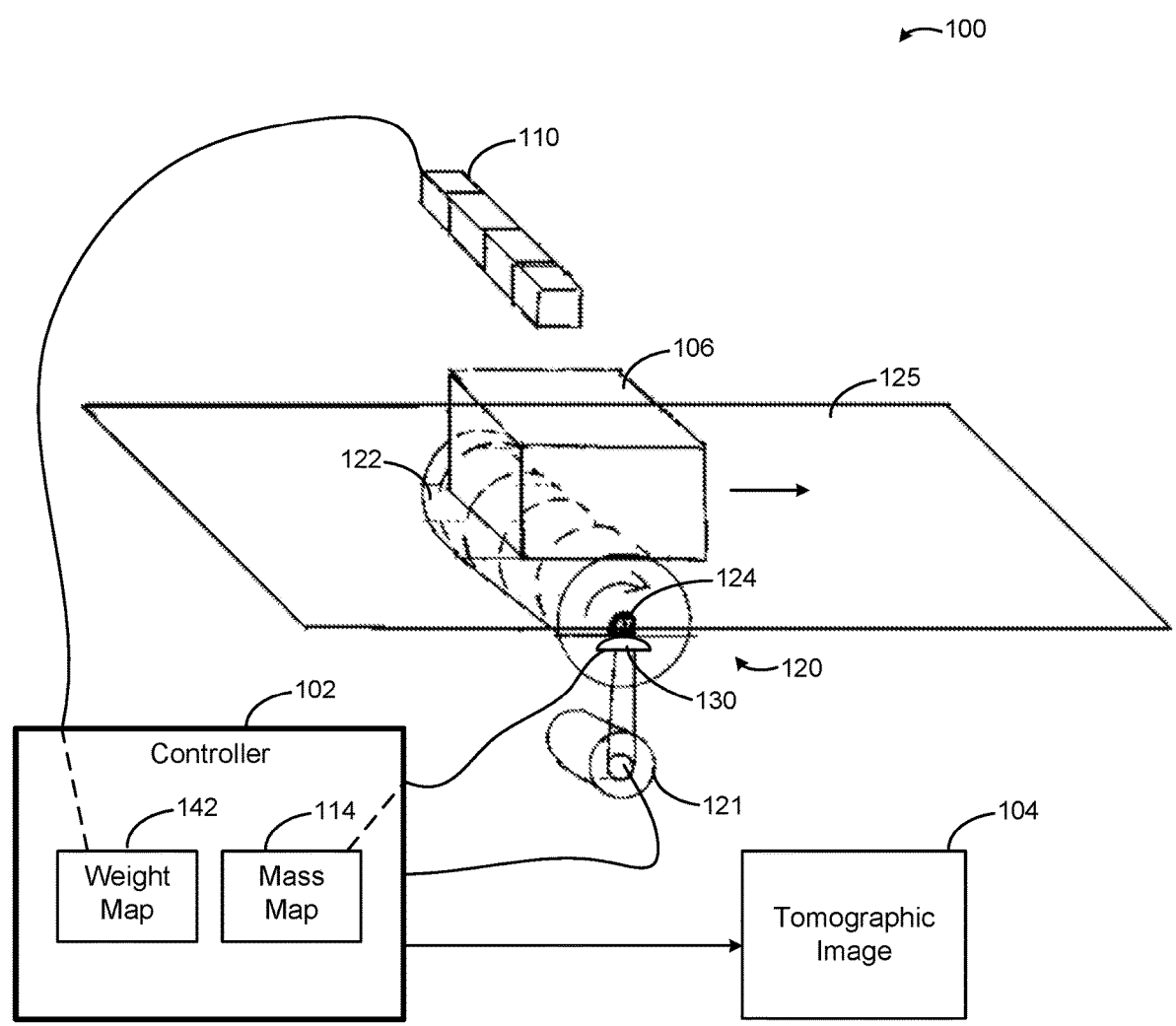
FIG. 1 illustrates a system including a sensor array and a conveyor with sensor elements according to an embodiment.

FIG. 1 illustrates a system 100 including a sensor array 110 and a conveyor 120 with sensor elements 130 according to an embodiment. Such an overall operational concept enables the system 100 to operate as a Macro Threat Detection System, based on inertial impulse and gravimetric inspection of the item 106 on a conveyor belt 125 conveyed along linear travel. The system 100 also includes a controller 102 coupled to the sensor array 110 and the conveyor 120 to collect and manipulate information about the item 106 including the weight map 142 and mass map 114 to produce a tomographic image 104. The conveyor 120 includes one or more motors 121 coupled to one or more rollers 122 that rotate about one or more axles 124. The sensor elements 130 are coupled to sense the rollers 120 via axles 124.

The conveyor 120 is illustrated as a security screening conveyor belt that transports cargo, packages, bags, or the like (item 106). The conveyor 120 can be arranged to receive and scan items from an exit portal of a conventional X-ray inspection system, for processing by this system 100 (e.g., the inertial macro gravitational system 100). The gravitational system 100 uses rollers 122 and actuating sensor elements 130 to apply vertical acceleration or displacement to the bottom of the item 106, as the item 106 passes over the impulse imparting rollers 122 and past the sensor array 110.

In an embodiment, the roller is passive and does not include sensor elements 130 (which can be implemented as roller sensors or roller actuators). The roller 122 can serve as, or can actuate, a conveyor belt that moves the item 106 along. The sensor array 110 of gravitational sensors, positioned above a path of the item 106, senses the gravitational gradient as the item 106 passes by. The rollers 122 underneath the item 106 can include or not include sensing or force-producing sensor elements 130. As the item 106 is conveyed, an individual sensor of the sensor array 110 of gravitational sensors senses information, analogous to a pixel in a reconstructed image of the sensed item 106. During movement, the gravitational sensor array 110 senses along a linear slice of the item 106, to sense the gravitational field that typically varies as the item 106 passes beneath the sensor array 110 of gravitational sensors.

In embodiments, the roller 122 can be provided as a single roller or multiple rollers. The conveyor belt 125 is flexible to accommodate movements, deflections, and surface variations of the roller 122 or the item 106. In another embodiment, the gravitational system 100 uses multiple rollers 122 to convey items, without using a belt 125 (e.g., in applications where items 106 have surfaces compatible with roller conveyance). Multiple rollers 122 can be arranged in series, following each other along a path of conveyance. The rollers 122 can be staggered. Multiple rollers 122 can share an axis of rotation. In an embodiment, a roller 122 can be formed as a plurality of discs that can rotate together or independently of each other, and can be mounted to shared or independent axles 124. In an embodiment, a roller axle 124 includes sensors or actuators (illustrated and referred to as sensor elements 130), to sense whether the roller 122 is being affected by the item 106, or to actuate the roller 122 to impart an impulse to the item 106. The gravitational system 100 uses such sensor information or actuator impulses delivered via axles 124, similar to embodiments that obtain such information or impart impulses directly through the sensor elements, e.g., when sensor elements 130 are provided on a surface of the roller 122 (see sensor elements 230 of FIG. 2).

In an embodiment, the roller 122 is formed by a plurality of discs or wheels. The conveyor belt system can be replaced by a plurality of many small roller wheels without a belt, the wheels being arranged repeatedly lengthwise and widthwise in place of the illustrated roller and conveyor belt. A given disc or wheel of the roller 122 serves the function of the sensor element 130 by providing impulse imparting or sensing features through the roller 122 via the axle 124 or other mounting components coupled to the roller 122. Thus, the gravitational system 100 may impart forces to the item 106, or sense wheel displacements caused by interactions of the roller 122 with the item 122, via actuators and sensors (sensor elements 130) that correspond to changes in the disc or wheel of the roller 122.

The sensor elements 130 can sense information from the roller 122, and can be actuated to apply forces to the item 106 via the roller 122. The sensor elements 130 detect forces, such as weight or acceleration. In an embodiment, the sensor elements 130 are strain gauges. The sensing enables the system 100 to use measurements to generate a weight map 142, which is a static DC-type of measure of the item's weight. The gravitational system 100 can also use measurements to sense dynamic properties of the item 106. For example, the gravitational system 100 senses dynamic properties of the item 106 by using sensor elements 130 to impart forces on the item 106, e.g., at different g-force acceleration levels. The gravitational system 100 senses the item's reactions to the imparted forces, which the controller 102 collects as additional measurements and input data. For example, the gravitational system 100 senses a measurement vector of the item's response to an impulse acceleration. The gravitational system 100 processes the sensed measurement vector to generate images or numerical measurements, such as a representation of the mass density of the object across different points, e.g., an image mapping of the sensed measurements.

The sensor array 110 includes a plurality of sensors, which can be gravitational field sensors, gravimeters, gradiometers, accelerometers, and the like. The sensors of the sensor array 110 can be inertia sensors or accelerometers, including inexpensive cellphone accelerometers.

The sensor array 110 detects effects caused by the roller 122 (or sensor elements 130) on the item 106 and vice versa. The sensor array 110 is illustrated as an array of sensors positioned generally above the conveyor 120. The sensor array 110 enables the gravitational system 100 to obtain or sense information about the item 110 from multiple perspectives, such as from above and below. In other embodiments, the gravitational system 100 is configured to obtain information from all directions around the item 106, similar to a CT scan.

The gravitational sensor array 110 provides to the controller 102 output signals having multiple characteristics including varying characteristics (e.g., alternating current (AC) signals) and constant offset characteristics (e.g., direct current (DC) signals). The roller 122 can provide a translation of an operational frequency of the gravitational system 100, from quasi-DC to an AC baseband. Such translations enable the gravitational system 100 to reduce or reject biases, such as common mode external gravitational mass biases and static electronic biases, that might cause high gain electronic amplifiers to drift. To eliminate drift or noise, the gravitational system 100 can process signals similar to the operation of a stabilized amplifier. The gravitational system 100 translates the actual sensed data from the differential detection to a different frequency, and filters out DC signal noise. The gravitational system 100 is sensitive enough that it is capable of picking up DC signal noise from a mass near the gravitational system 100, flickering lights that impart a noise signal, or other sources of gravitational or electrical noise. In an embodiment, the gravitational system 100 uses an AC bandpass filter to reject the external noise, drift effects, static mass effects, and the like. In an embodiment, the gravitational system 100 includes lock-in amplifiers configured to reduce or reject such biases, using the lock-in amplifiers in a manner similar to how they are used when taking low-energy quantum transition related measurements.

In operation, the gravitational system 100 uses the roller or rollers 122 to obtain, via sensor elements 130, the weight mapping and the inertial mapping of the item 106 (e.g., based on weighing the item 106 and determining the response behavior of the item 106 subject to acceleration impulses). The roller 122 and its sensor elements 130 enable the gravitational system 100 to obtain a gravitational weight-force acceleration measurement. In addition to the roller or rollers 122 and the sensor elements 130, the gravitational system 100 uses the gravitational sensor array 110 to obtain a mapping of the gravitational force exerted by the item 106. The mapping is able to "see through" the item 106, to sense various mass components in the item 106. In an embodiment, the upper sensor array 110 includes an array of gravimetric accelerometers to scan the item. Subsequently, the upward force actuators (sensor elements 130) of the impulse imparting roller 122 impart an upward force to a particular pixel mass element corresponding to a particular coordinate on the base of the item 106. This upward motion is sensed by the gravitational sensor array 110 (which can be accelerometers in an embodiment) acting in a "gravity gradient" mode to detect changes in gravity caused by the item 106. The gravitational sensor array 110 also operates in a "gravity field" mode to detect absolute values of the gravity caused by the item 106.

In an embodiment, the sensor array 110 includes accelerometers that serve as gravimetric sensors that include a witness mass which is part of the accelerometer. The witness mass can be incorporated as a semiconductor, a micromechanical, or other type of component of the sensor. The witness mass can be implemented as a beam, crystal, or similar structure of the sensor that, when accelerated, generates and imparts a force to the sensor through deflection of sensor components. In another embodiment, the witness mass can be external to the sensor, used as a calibrating mass to calibrate a gravity sensor, gradiometer sensor, or the like.

In embodiments, the gravitational system 100 can collect information about the item 106 from vertical directions, horizontal directions, and other directions based on the arrangement of the roller 122, the sensor elements 130, and the gravitational sensor array. For example, embodiments can include gravitational sensor arrays 110 that are stationary or movable, or gravitational sensor arrays 110 that extend around a portion or an entirety of a periphery of the roller 122 or conveyor belt 125 (e.g., a circular or wrap-around sensor array 110 configuration). Such embodiments enable the gravitational system 100 to obtain gravitational information from other directions besides vertical, such as from horizontal directions or diagonal directions. In an embodiment, the gravitational sensor array 110 is provided similar to a phased array antenna having static sensors that are electronically switched to cover a plurality of sensing angles and positions. Embodiments can obtain different sensing configurations by electronically switching the sensor array 110.

The gravitational sensor array 110 is illustrated as a linear upper bar disposed generally above the roller 122. Other arrangements of the gravitational sensor array 110 include movable arrays, multi-part collections of arrays, curved arrays, wrap-around arrays, oval arrays or circular arrays, and the like. The gravitational sensor array 110 can be linear or curved (e.g., forming an arc, or even an entire closed loop such as an oval or circle), to achieve multiple angles of sensing. Such sensor arrays 110 provide information about the item 106 in addition to information obtained by roller 122 and sensor elements 130. The controller 102 can combine such multiple sources of information to generate the tomographic image 104 of the item 106.

Such arrangements enable sensor coverage in a Z direction for three-dimensional tomograms. In an embodiment, the gravitational sensor array 110 is formed by a collection of multiple linear sensor arrays arranged statically in a generally curved arrangement. In another embodiment, one or more arrays of sensors are configured to move along a curved or circular track. The track can wrap around the roller 122 partially or fully.

Embodiments of the gravitational system 100 can combine gravitational sensor information and roller information, and can use such information independently without combining.

In another embodiment, the gravitational sensor array 110 is turned off or omitted from the gravitational system 100. The gravitational system 100 advances the item 106 along, using the sensor elements 130 (roller sensors or roller actuators) to measure a portion of the mass of the item 106, corresponding to a line of the item 106 above the sensor element 130 as the item moves over the roller element corresponding to that sensor element 130. The gravitational system 100 constructs the mass map 114 or weight map 142 of the item 106 as it moves over the roller 122, from multiple measurements of multiple sensor elements 130 and multiple sensors in the sensor array 110.

The controller 102 enables operation of the gravitational system 102 involving low-level gravitation signals, similar to single-photon experiments in laser physics. With gravitation, the sensor array 110 detects extremely small differences in forces that the gravitational system 100 is measuring, such as different masses being scanned by a sensor, or detecting a gravitation gradient. Accordingly, the gravitational system 100 includes techniques to reduce or eliminate the effect of noise and better isolate the signal from the noise. An example technique is to synchronize the instrumentation (e.g., the gravitational sensors, sensor elements, actuators, and the like) with a signal the gravitational system 100 uses to filter out the noise, e.g., via a phase-locked loop, lock-in amplifier, or the like, to enable the gravitational system 100 to extract low-level signals.

Figure 2:
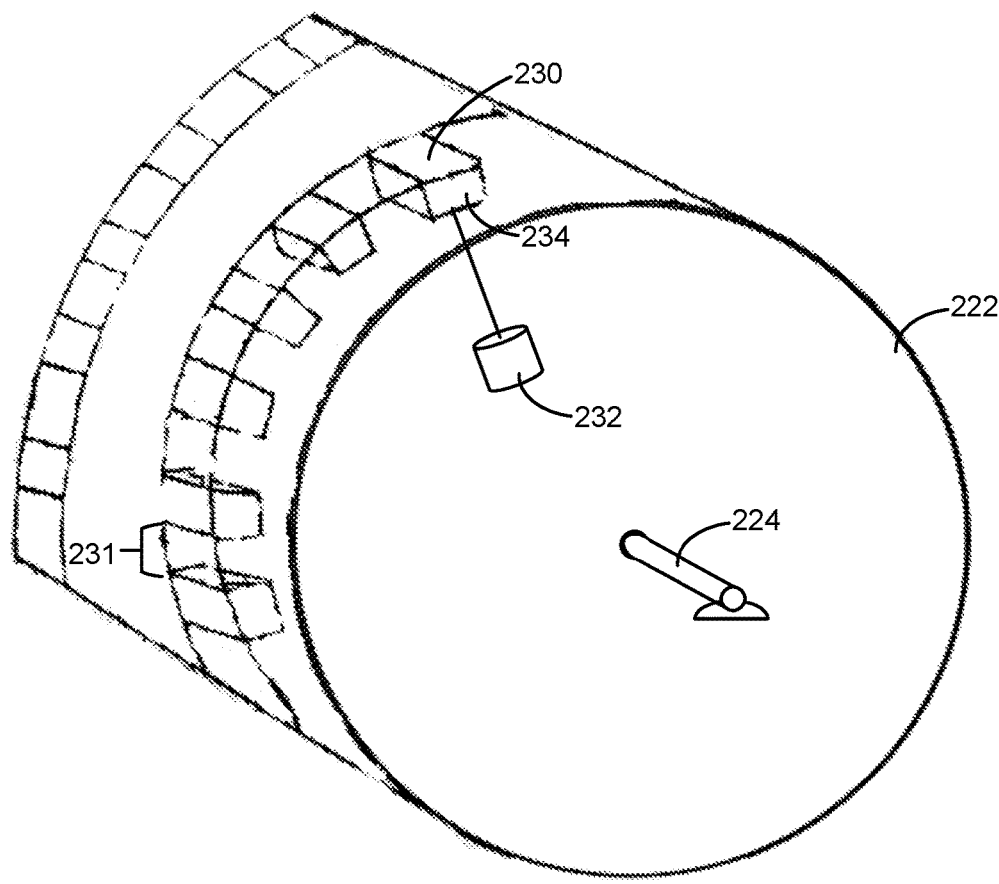
FIG. 2 illustrates a roller of a conveyor according to an embodiment.

The gravitational system 100 also uses the roller or rollers 122 to introduce an additional gravitation-like inertial force, whose contribution the gravitational system 100 detects as an additional detection parameter, in a manner similar to the effect of gravity. The inertial force can be applied from a collision between a roller 122 and the item 106, where the item is bumped upward upon contact with the roller 122 or roller sensor elements 130 (disposed on the roller as illustrated in FIG. 2). The rollers 122 can be positioned with a vertical offset above a plane of the conveyor belt 125, to induce a collision with the item 106 conveyed toward the rollers 122.

Embodiments are configured to identify a mass profile or mapping (X-Y map) of the item 106, based on rest mass (e.g., weight) and accelerated mass (e.g., inertia). The X-Y map also can be represented as a topographic X-Y-Z mapping, with Z being the mass corresponding to the individual cells at a particular X-Y location. The gravitational system can measure rest mass by operating like a scale, using the sensor elements 130 to sense a weight of the item 106 based on the effect of gravity on the item's mass as detected by rollers 122 or roller sensor elements 130. The gravitational system 100 can measure inertial mass by imparting a force on the item 106, e.g., based on the rollers 122 or roller sensor elements 130 imparting an impulse force when the item 106 collides with the rollers 122 or roller sensor elements 130.

Accordingly, the term "sensor" as used herein can serve as an inertial sensor. An inertial sensor in this context can measure displacement of a slice of mass supported by a roller 122 or roller sensor element 130 underneath the mass as a function of time. When the force is applied to the slice of mass by the actuator (sensor element 130) in the roller, the force can be calculated using, e.g., the value of the actuator voltage applied to a well-characterized piezoelectric actuator (or other type of actuator or sensor, such as a solenoid or other mechanical device).

When the actuator applies the force to the item 106, the controller 102 may calculate the transient behavior of the mass slice as a function of time. Initially, a bottom of the item 106 and its various contents act as a "spring-like" storage device for the energy imparted by the actuator, but ultimately a steady-state value of inertial mass is obtained by Newton's second law F=MA. This steady state value would be equal to the rest mass or "weight" at that point. The static measurement or weight measurement (rest mass) would by analogy be similar to "DC" voltage measurement, whereas the "inertial" or accelerated mass measurement would be more like an "AC" voltage measurement. The "inertial" or accelerated mass measurement can show the dynamic value of the voltage trace or "resonances," akin to what an AC circuit can show. Translated to the time domain, a measurement of "weight" is analogous to solving an algebraic equation to get the mass. However, an inertial mass is analogous to solving for the parameters making up a differential equation for that slice. These "weight" and "inertial" parameters form the elements of an input vector. The input vector can then be input into a state variable type of matrix differential equation. The state variable type of matrix differential equation is used to extract the one or more parameters that would be fed into an inversion type of filter. The inversion type of filter is used to construct the real or pseudo "image." The inertial sensor can provide more information, that could be used in various ways, e.g., in conjunction with the overhead gravimetric sensor array's measurement of mass, to give a higher resolution image of the contents in the item 106 being scanned.

The gravitational system 100 can perform such measurements to reveal resonances or other movements of the item 106, enabling the gravitational system 100 to obtain other information about the item 106 used to process and construct an image or mapping. Accordingly, embodiments can use interactions with the item 106, via rollers 122, roller sensor elements 130, and the like, to measure rest mass, while also using features such as imparting force sensors (e.g., a type of roller sensor element) to impart forces on the item 106. For example, an embodiment uses force sensors to impart a deflection of from less than one millimeter to several millimeters, dependent upon type of force sensor elements used, how many sensor elements are arranged in parallel, and the typical mass of the item 106. Thus, the embodiment imparts the force impulse on the item 106 and takes measurements regarding how the item 106 reacts. The embodiment also takes measurements when the item 106 is at rest. The gravitational system 100 can obtain such contact-based measurements independent from or in conjunction with the non-contact-based measurements (e.g., as sensed by the gravitational sensor array 110). The gravitational sensor array 110 can sense the item's influence on gravitational fields while the item 106 is at rest or in motion from undergoing force impulses. Rest mass is analogous to weight, a scale measurement. But by imparting different forces, the controller 102 can collect a set of measurements reacting to a g-force of 1 g by weight, or can collect a series of measurements for reactions to series of g-forces. Such measurements can reveal resonances or other movements of the item 106 that the controller 102 processes to construct maps or images. The controller 102 can direct actuators or sensor elements 130 to displace the item 106 over different distances, such as a fraction of a millimeter deflection, or a few millimeters. For example, the controller 102 can apply an impulse to give the item a "kick," take sensor array measurements and sensor element measurements regarding the gravity, force, and displacement, then allow the item 106 to rest and use the sensor elements 130 to measure a rest weight of the item 106.

The gravitational system 100 can obtain the X-Y map (e.g., weight map 142) by performing a detailed weighing of each slice of the item 106 as it passes across the roller 122. The gravitational system 100 also performs a detailed gravitational measurement of the item 106 as it passes by the gravitational sensor array 110. The gravitational system 106 uses the measurements to create a mass-weight image (weight map 142, mass map 114), e.g., on a pixel-by-pixel basis where a pixel corresponds to sensor resolution of the roller sensor elements 130 or gravitational sensor array 110. The gravitational system 100 can use mathematical techniques similar to CT scanning tomographic reconstruction, where sensed X-ray slices from different angles are combined with back propagation to reconstruct an image of that slice. The gravitational system 100 uses gravitational sensor array 110 and weight or acceleration effects via sensor elements 130 to sense information about the item 106 to obtain tomographic-like slices of the item 106, to create the item image as the item 106 passes over the roller 122, similar to CT scanning. The gravitational system 100 generates image pixels after processing the image, but individual elements are voxels because the gravitational system 100 generates three-dimensional volume information about the item 106. The gravitational system 100 generates a voxel-based map decomposition of the three-dimensional item 106 that passes across the roller 122.

Example systems and methods can obtain and process data using various techniques. In an embodiment, the system 100 performs multi-parameter acquisition or sensing of observable kinematic or dynamic parameters of the items 106 under observation. The system 100 processes the parameters using a state variable-based estimating filter or processor, such as an extended Kalman Filter with or without Neural Net enhancement or estimators.

The system 100 includes the controller 102, also referred to as system controller 102, and feeds the processed parameters to the system controller 102 for actionable control variables or values. The system controller 102 uses one or more processors to perform pattern recognition or image reconstruction. In the context of security screening, the system 100 uses the outcome of the pattern recognition or image reconstruction to activate an alarm, stop a conveyor, or activate an ejection arm or gate to selectively control whether the item 106 may advance. The system can construct a visual pseudo-image overlaid with questions or recommendations for presentation to a human operator, who can interpret such output and take appropriate further action.

The gravitational system 100 includes embodiments that can continuously roll the item 106 through for scanning, or that occasionally pause or stop the roller 122 to achieve a stop-and-go motion of the item. For example, the gravitational system 100 can advance the item 106 using a first orientation or configuration of the gravitational sensor array 110 or roller sensor elements 130, then pause the item 106 and reconfigure or reorient the gravitational sensor array 110 or roller sensor elements 130 according to a second configuration, then advance the item 106 for scanning using the second configuration, and so on. Embodiments can use stepper motors for precise control and positioning of the various movable elements, including the rollers 122, actuators (sensor elements 130), or sensor mounts (e.g., actuated mount 716 illustrated in FIG. 7).

Embodiments can obtain the three dimensional tomographic image 104 of the item 106 by performing multiple passes, e.g., by performing one pass, rotating the item about the X, Y, or Z axis, and performing another pass (repeating as needed to cover multiple positions or orientations). The gravitational system 100 can perform a single pass to obtain a topographical map of the item oriented in a direction of the item 100 relative to the gravitational sensor array 110 and the roller 122. Embodiments can rotate the item 106 between scans, e.g., using a sequence of roller scanner systems 100 with item rotators between systems 100. Such an embodiment scans the item 106 by a first roller scanner system 100, rotates the item about an axis, scans the item 106 by a second roller scanner system 100, and so on. Such rotations enable the gravitational system 100 to obtain more information about the item 106 from multiple directions, to construct a full tomographic image 104 reconstruction informed by multiple scan directions, going beyond a topographic reconstruction from one direction.

The gravitational system 100 processes the force information and displacement information to determine, among other information, the mass or weight and inertial movement of the item. In an embodiment, the gravitational system 100 operates with such parameters using a custom sensor fusion and "Radon Transform Backpropagation-Like" reconstruction algorithm. The reconstruction algorithm is similar to a line integral, e.g., as used with X-rays passing through a target. The gravitational system 100 uses the reconstruction algorithm to reconstruct the item 106 that the gravitational system has sensed (via gravitational sensor array 110, roller sensor elements 130, and so on) after multiple sensor "hits" to obtain density attenuation information at each pixel or point in the coordinate system of the item 106. The gravitational system 100 can run the reconstruction algorithm on a numerical vector array processing computer. The computer can be optimized by incorporating specialized processors or architecture (such as GPUs, ASICs, and the like) and specialized software and firmware to operate the specialized architectures and the like. The reconstruction algorithm can be implemented as an adaptation of the line integral radon transform backpropagation technique, used in classical CAT scan parameter estimation and signal processing reconstruction.

In an embodiment, the controller 102 reconstructs the tomographic image as follows. The controller 102 generates the mass map 114, also referred to as a volumetric map of the mass density (p) of the material making up the object being inspected, by using the sensor array 110 to sense the item 106. For example, the controller 102 uses a gravitational gradiometer sensor array 110 to obtain measurements of a gravitational gradient G's tensor. The controller 102 uses a similar approach to obtain the weight map 142, using the sensor elements 130 to sense the weight of the item 106. Embodiments also may obtain other maps, such as inertial or acceleration or force maps, by actuating the sensor elements 130 to apply an impulse to the item 106 and sensing a response pulse from the item 106, storing this information as a tensor.

Using the tensor from the mass map (among these various tensors from the other maps) as an example, independent components of this tensor correspond to the integrand $f(x,y)$ of the Radon transform. According to Gauss's law of gravitation in point differential form, $$G' = \nabla \cdot g = -4\pi G \rho$$

where $\nabla \cdot g$ is the Divergence Operator working on the gravitational field strength, g, and G is the classical Gravitational Constant.

In an embodiment, the controller 102 applies classical Radon Transform and Inversion techniques (e.g., such as the approaches used in Computed Axial Tomography (CAT)), while using the gravitational gradient measurements in place of, e.g., X-ray attenuation measurements as used in CAT scan systems. The controller 102 applies such techniques to obtain information corresponding to a series of image slices of the item 106 undergoing scanning. The controller 102 can perform such techniques using existing software packages for tomographic reconstruction, e.g., open source toolboxes such as PYRO-NN, TomoPy, CONRAD, ODL, the ASTRA toolbox, TIGRE, and the like.

More specifically, the controller 102 uses G' as an integral function (Integrand) $f(x,y)$ in a line integral Radon Transform, in contrast to CAT scan systems that would use an X-Ray intensity ratio $I/I_0$. The controller 102 uses a Radon Transform defined by the following equation:

$$\mathbb{R}\{f(x,y)\} = \int_L f(x,y) dl$$

which is an integral along a line l of a suitably well-behaved function $f$ which then maps to a line perpendicular to the line of integration, corresponding to a projection of the item 106 to the sensor array 110 (or sensor elements 130 for the weight map 142)) as detected by the gravitational influence the item 106 exerts on the sensor array 110 for a given orientation/position of the item 106 relative to the sensor array 110.

The controller 102 computes the integral multiple times along multiple parallel l lines (e.g., as sensed by multiple elements comprising the sensor array 110) through the item 106 exhibiting the function $f$ throughout all the (x, y) points within the item 106. The results can be plotted as a curve along a line perpendicular to the multiple l lines. This new perpendicular line is effectively the projection p of the individual Radon Transforms, characterized as a function of r and $\phi$ as illustrated by the following equation, where $\mathbb{R}$ symbolizes the Radon Transform:

$$p(r,\phi) = \mathbb{R}\{f(x,y)\}$$

In order to get more views from and hence more data of the composition of the item 106 being scanned, the line p is rotated around the item 106 by varying $\phi$ while sensing and storing the values of $\mathbb{R}$, obtained in a matrix for further processing. For example, the system 100 can reorient the item 106 and rescan the item 106 with the new orientation. In an embodiment, the system 100 rotates the item 106 on a turntable while obtaining scans. In another embodiment, the system 100 uses an actuated mount to reorient the sensor array 110 while obtaining scans.

The controller 102 stores the projection function $p(r,\phi)$, which the controller 102 has sensed using the sensor array 110 for sensing the gradient of the gravitational force, in matrix form, e.g., using the controller 102 serving as a system numerical processing/image reconstruction computer. A similar approach can be used to store the corresponding information sensed by the sensor elements 130. The controller 102 uses the stored projection function to obtain the volumetric mapping of p, the mass density as a function of location in the item 106 undergoing scanning, which the controller 102 uses to generate the tomographic image 104. The controller 102 can use the stored projection function to recover the function sought, $\hat{f}(x, y)$, after suitable signal processing and post-acquisition computation of the acquired item's gravitational gradient and dimensional data as sensed from the sensor array 110 (e.g., gravimetric sensors) and sensor elements 130 (e.g., weight, force, or displacement information). In the case of either gravitational field, g, or gradient G', the system 100 can use different sensors to measure each quantity respectively to obtain various corresponding maps, such as mass map 114, weight map 142, dynamic acceleration map, inertial mass map, and the like. The controller 102 determines the locations of the various increments of ρ from the conveyor 120 below, synchronizes such information with the gravitational scanning from the sensor array 110 above, and computes the actual value of ρ at any point in the item's volume. The controller 102 accomplishes this by taking the function p(r, ϕ), which is the Radon Transform of the function $f(x,y)$, and computing its inverse.

To obtain the mass density p, the controller 102 can use a number of techniques to invert the acquired Radon Transform. In an embodiment, the controller 102 uses a simple back projection algorithm, as expressed by the following conceptual summation (integral) of the individual projections:

$$\hat{f}(x,y) = \Sigma_{j=1}^{n} p(r, \phi_j) d\phi$$

The controller 102 uses this equation to recover the function $f(x,y)$ which corresponds to the Gravitational gradient G's tensor, depending on which type of sensor is used (e.g., gravitational-sensing sensor array, force-sensing sensor elements 130). In an embodiment, the controller 102 uses filtered back projection by inserting (in a digital sense) various filters in the reconstruction algorithm. Such filters include the Ramachandran-Lakshmininarayanan (Ram-Lak), Hamming, Low Pass Cosine, Shepp-Logan, or others that the controller 102 uses to reduce artifacts, improve contrast and resolution, and reduce noise.

The controller 102 can perform these operations as a convolution integral of p(r, ϕ) and the filter function h(r) in the spatial domain as follows:

$$p'(r,\phi) = p(r,\phi) * h(r)$$

where "*" symbolizes the convolution integral. Inversion of the Radon transform for p'(r, ϕ) can be done in several ways, although many can be computationally intensive. An expeditious method for performing the inversion takes the product of the Fourier Transform of projections, P'(k, ϕ), and the filter functions, H(k), where "k" corresponds to the "frequency domain" parametric mapping, as opposed to the polar coordinates used in the Radon Transform. Then the controller 102 applies the inverse Fourier Transform to get back $f(x,y)$. This works because convolution in the spatial domain equates to multiplication in the frequency domain, which is faster. Also, the controller 102 applies additional filtering and interpolation functions to reduce image artifacts and improve image clarity and resolution. The controller 102 multiplies these in the Transform's frequency domain and then recovers the original function $f(x,y)$ containing the mass density, ρ, by taking the inverse Fourier Transform of the product of the Radon Transform P'(k, ϕ), and its filtering and interpolation functions H(k), and then taking the inverse Fourier Transform, F', of this product:

$$P'(k,\phi) = P(k,\phi) H(k)$$

Resulting in the following equation which represents the recovery of the back projected image of the function $\hat{f}(x, y)$ containing the mass density:

$$\hat{f}(x,y) = \Sigma_{j=0}^{n} \mathbb{F}^{-1}\{P'(k,\phi_j)\} d\phi$$

Because $\hat{f}(x, y)$ is not the desired mass density, the controller 102 then scales $\hat{f}(x, y)$ by division by $-4\pi G$, as set forth above in the earlier equations relating the Gravitational Gradient at any differential (point) mass element to the mass density of that element ρ at each location in the object being inspected. Thus, the controller 102 obtains the information for the tomographic image 104. The controller can provide the tomographic image 104 numerically, or can render a graphical representation of the tomographic image 104 using visualization or graphing software modules.

The mathematical equations and relationships used can employ the differential form of Gauss's Theorem for gravitational fields in solving for the mass (M) or mass density (ρ) of an element (voxel) in conjunction with conventional CAT Scan tomographic algorithms.

The signal propagation involved in operation of the gravitational system is based on sensing gravitational fields or the effect of acceleration in response to acceleration impulses. Accordingly, in some embodiments (e.g., the turntable embodiment of FIG. 3) the signal propagation may not involve a signal source that sends a signal through the item. The signal propagation does not need to be source-through-sample-to-detector. Rather, the signal propagation of some embodiments of the gravitational system is more akin to a closed volume surface integral extraction similar to solving a Poisson equation from a gaussian surface flux boundary.

The gravitational system 100 uses the data set to produce an image of the mass density of the constituent objects that form the item 106. Embodiments of the gravitational system 100 reconstruct the item's mass distribution, similar to approaches used in electromagnetic field theory. In an embodiment, the gravitational system 100 applies a classical implementation of Gauss's theorem (involving a divergence integral over a surface to extract an electrical charge at a particular point by mathematically enclosing the point with a surface and performing an integration over the surface). Embodiments can perform a similar application of Gauss's theorem, but instead of an electrical field, the embodiment applies the theorem in the context of a gravitational field. Accordingly, the gravitational system 100 uses Gauss's theorem to obtain a delta G gravitational gradient. The gravitational gradient is similar to the gradient of a charge potential enclosed by a surface, where integrating over the surface determines the charge. The resulting tomographic image 104 thereby allows for the detection of threat objects, or any objects of a given mass density and shape. Embodiments of the gravitational system 100 sense and map the absolute measurement of the gravitational field, the gravitational gradient, or a combination of both, as affected by the item 106. Accordingly, embodiments enable a detailed and high-confidence-level detection decision of whether the item 106 is associated with a threat object.

Where gravity is a three dimensional vector, the gravity gradient is a $2^{nd}$-order tensor which is defined by nine separate quantities. The gravity gradient is a second order tensor (i.e., matrix) which is defined as the gradient of the gravity force. The gravity gradient at a given position is described by the nine quantities of the second order tensor. However, since the gravity field is described by a Laplace partial differential equation (i.e., Gxx+Gyy+Gzz=0) and the matrix is symmetric and only five of the nine quantities are independent. These quantities can be arranged in a square matrix notation.

The sensor array 110, which can comprise gravimeters (i.e., instruments that measure gravity), can provide a measure of gravity at one position. Approaches described herein enable determining a gravity gradient, which describes how gravity is changing with position at that position. Unlike optical or electro-magnetic environments, gravity gradients cannot be hidden or screened from observation due to the nature of gravitational fields as influenced by objects having mass. For these reasons, gravity gradients are descriptive of changes in the gravitational field that arise due to anomalies, e.g., due to mass or voids within an item 106 undergoing scanning. The sensor array 110 can comprise gravity gradiometers. A gravity gradiometer is an incredibly sensitive device that measures the derivative of gravity with respect to distance. The unit of measure for the gravity gradient is the Eotvos (10-9 s-2), which is approximately equal to the gradient of the gravitational force field produced by 10 grains (~9 milligrams) of sand at a distance of 1 centimeter. Modern gravity gradiometers have a resolution of <1 Eotvos.

In use, the controller 102 outputs the tomographic image 104. The controller 102 also can output underlying numerical measurement information used to form the tomographic image 104. The measurement information differs from the image in that the measurement information can include more detailed information that may not be visible in an image. For example, the gravitational system 100 can highlight, color code, or otherwise graphically manipulate the tomographic image 104 to provide measurement visualizations. The underlying measurements can be more detailed, and can be distinguished more readily (e.g., by numerically comparing one measurement to another) than a visual comparison by an operator who, e.g., is visually comparing different shades of a color in an image. In embodiments, the gravitational system 100 can use the underlying measurements to perform automatic pattern recognition, or threat recognition, or other automated processes. The gravitational system 100 can generate an image for an operator to use when double-checking the automated determinations.

The gravitational system 100 can display the output tomographic image 104 and array of mass density points immediately in real-time. The displayed output can be viewed and used by an operator, e.g., to perform a human-based decision of threat or no threat. The gravitational system 100 also can provide the output in electronic array format, and can process the output to decide whether the output corresponds to a threat. The gravitational system 100 can have controller 102 perform, or include a subsequent processor or send the output to a subsequent processor, for use in conjunction with other data, such as X-ray scan data, in order to arrive at a go or no-go threat decision at a higher confidence level. Embodiments of the gravitational system can include multiple stages that feed output to each other, to help resolve issues. The gravitational system 100 can serve as an output state to receive output from an X-ray scanner. Accordingly, the gravitational system 100 helps to resolve ambiguous X-ray scanner alarms or otherwise resolve outcomes from the X-ray scanner that could not be resolved at the X-ray scanner. For example, an item shielded from X-rays will result in an alarm at the X-ray scanner, but the gravitational system 100 can resolve the alarm by using gravitational and force impulses to "see" through the X-ray shielding and resolve elements of the item 106 that are otherwise hidden in an X-ray scanner. The gravitational system 100 thereby also reduces or resolves false alarm situations and ambiguous situations that arise with X-ray scanners.

In an example usage scenario, the system 100 processes the gravitational field to generate usable information and determine whether, e.g., a given X-ray-based alarm is true or false. The given X-ray-based alarm can be generated by a given X-ray image that was, e.g., flagged as a threat or as a shield alarm during screening. For threat alarms, the system uses the gravitational field information to confirm whether the threat alarm is true or false. Shield alarms correspond to situations where contents are shielded by something that blocks or obscures X-rays, preventing contents from being positively identified. For shield alarms, the system provides gravitational-based actionable data (materials or otherwise) regarding the internal composition of shielded contents, that is otherwise obscured when X-ray scanning. The example gravitational-based systems and methods provide unique advantages over electromagnetic radiation-based scanning (X-rays, millimeter waves, or others), because the example gravitational-based systems and methods provide results that are not attenuated by electromagnetic shielding or camouflaged by, e.g., metal foils, lead block, curtain shielding, or the like.

FIG. 2 illustrates a roller 222 of a conveyor according to an embodiment. The roller 222 rotates about axle 224, which is shown coupled to a sensor (such as a sensor element 130 illustrated in FIG. 1) to detect forces on the roller via the axle 224. The roller 222 includes a plurality of sensor elements 230 that are arranged with spacing 231 between adjacent sensor elements 230. A given sensor element 230 can be provided in various implementations, including a piezoelectric element 234 for sensing, and a solenoid portion 232 for actuating. An embodiment can use different combinations and variations of sensor elements 230 disposed in the roller 222, disposed at the axle 224, or a combination of approaches for dispersing the sensor elements 230 throughout the conveyor.

An embodiment of the roller 222 can have multiple impulse imparting or sensing elements (referred to herein as "sensor elements" 230) on the surface of the roller 222. These sensor elements 230 in effect measure the inertial forces and weight forces caused by interactions between the roller 222 and the item to be scanned. Measuring such forces enables the gravitational system to sense a tomographic-like mass X-Y map across the bottom surface of the item.

The sensor elements 230 are shown arranged in circumferential bands along the roller 222. The roller sensor elements 230 can be arranged inside the roller 222 or on its surface. An illustrated roller sensor element 230 includes an arcuate surface (see detail view of FIG. 3), to conform with a surface radius of the roller 222 when the sensor element 230 is installed in the roller 222. In other embodiments, the roller element 230 can include a flat surface, a pointed surface, a concave surface, a convex surface, or other surface configurations to interact with the item. For example, the surface of the roller sensor element 230 can be shaped to impart an impulse to the item or to sense a weight, mass, or inertia of the item. Roller sensor elements 230 can be coupled to the roller 222 in various configurations. In an embodiment, the roller sensor elements 230 are actuators, and the actuators are disposed on the roller 222 so that their arcuate surface is flush with the roller 222. Such configuration enables the roller sensor element 230 to weigh the portion of the item or cargo above the sensor element 230 (e.g., the corresponding "slice" of item) as the item passes over the roller 222. Because the curved surface of the roller sensor element 230 is flush with the curved surface of the roller 222, the roller sensor element 230 imparts an upward impulse to the item consistent with the impulse that would be caused by the curvature of the surface defined by the roller 222 and roller sensor elements 230. In another embodiment, the roller sensor element 230 extends above the curved surface of the roller 222, which enables the roller sensor element 230 to impart an additional upward impulse on the item, corresponding to the additional extension of the roller sensor element 230 beyond the roller surface. The gravitational system processes the inertial and mass information obtained by the plurality of roller sensor elements 230 similar to an X-ray sinogram line integral approach, to generate a mass mapping.

In another embodiment, the roller sensor elements 230 are configured to impart an impulse to the item. A surface of the roller sensor element 230 protrudes above a surface of the roller 222, to impart an additional impulse to the item as the item encounters the roller sensor element 230. The imparted impulse is associated with a force function, and enables the roller sensor element 230 to obtain an inertial type of measurement separate from a weight or mass measurement.

The sensor elements 230 can include a sensor or an actuator. In an embodiment, the roller 222 itself (or disc, wheel, and the like) can serve as a sensor or actuator by actuating the entire roller 222 or disc portion of the roller 222. The sensor element 230 can be provided as a sensor such as a strain gauge, accelerometer, or the like. The sensor element 230 can be provided as an actuator such as a mechanical coupling, a spring, a piezoelectrically actuated element, a pneumatically actuated element, or the like to allow the sensor element 230 to deflect or actuate for interactions with the item. The actuator enables the sensor element 230 to impart an upward force.

In an embodiment, the actuator can be based on a cam system including pushrods. For example, the gravitational system can include a camshaft at the roller axle and pushrods arranged radially, extending between the roller axle 224 and the roller sensor elements 230. The roller axle 224 can have a camshaft with lobes. When the gravitational system rotates the roller 222 about the camshaft axle, the pushrods ride the cams at the center of the roller axis and the cams cause the pushrods to actuate the roller sensor elements 230 inward and outward. Accordingly, the gravitational system cam at the center of the axis of the roller 222 imparts a cam-based upward thrust into the sensor element 230. Other such mechanical arrangements are contemplated, including external camshafts or mechanical actuators that operate with or without a camshaft or pushrods, based on mechanical movement of the roller 222 or other mechanical aspects of the gravitational system. In another embodiment, electronic actuators are used, such as solenoid-based or piezoelectric-based electronic actuators. Embodiments also can use actuators that include sensors, or use actuators that also function as sensors (e.g., piezoelectric crystals), to identify how its roller sensor element 230 is positioned, e.g., how far out or in the roller sensor element 230 is located relative to the roller 222.

The gravitational system determines such roller sensor element status information, and determines the position where the roller sensor element 230 is located relative to a given area of the item undergoing scanning. The gravitational system can use a rotation sensor to determine when to actuate a roller sensor element 230. For example, the gravitational system senses a position of the rotation sensor corresponding to a given roller sensor element 230, and sends a signal to an amplifier configured to send an electrical pulse into a piezoelectric crystal actuator 234 to cause that given roller element to actuate upward. In another embodiment, the actuator can be a solenoid 232 that the gravitational system energizes to actuate a pushrod that actuates the roller sensor element 230.

The sensor portion (e.g., sensing first portion 336 illustrated in FIG. 3) of the roller sensor element 230 enables the roller sensor element 230 to measure what force impulse the roller sensor element 230 is applying to the item. The sensor portion of the roller sensor element 230 can also measure displacement of the roller sensor element 230, corresponding to movement of the item in response to the upward force imparted by the roller sensor element 230.

Embodiments can impart an impulse to the item by actuating the roller sensor elements 230 disposed in the roller, actuating the entire roller, disc, or wheel via sensor elements at the axle 224, or by actuating the roller sensor elements 230 and the entire roller, disc, or wheel. The gravitational system rotates the roller 222 to continuously scan the item as the item rolls across the roller 222. In embodiments having roller sensor elements 230, the item can come into contact with multiple roller sensor elements 230 simultaneously. For example, the roller sensor elements 230 extend outward from the roller 222, such that a given sensor element 222 is deflected by contact with the item and remains in contact as the roller 222 advances the item, allowing the item to also simultaneously come in contact with additional roller sensor elements 230. In such an embodiment, the gravitational system can actuate multiple sensor elements 230 simultaneously or sequentially, to impart impulses (and also to sense interactions) via multiple roller sensor elements 230 simultaneously or in sequence. In an embodiment, multiple roller sensor elements 230 are arrayed around a periphery of the one or more rollers 222, discs, or wheels, to have continuous sensing capability and actuatable movement as the item rolls across the one or more rollers 222, discs, or wheels.

In an embodiment, the gravitational system includes a plurality of roller sensor elements 230 arranged on the roller 222 to impart upward forces according to a regular periodic function. For example, multiple roller sensor elements 230 are arranged on the roller 222 such that for a given circular cross-section of the roller 222, the roller sensor elements 230 are spaced apart from each other by spacing 231 along a circumference of the roller 222. The spacing 231 between roller sensor elements 230 causes operational rotation of the roller to bring the roller sensor elements 230 into contact with the item at a periodic rate, e.g., at a rate of 5 Hz corresponding to operational rotation of the roller 222. The gravitational system can generate a corresponding 5 Hz signal from the roller sensor elements, and subtract such a "carrier" signal out from the overall signals collected by the gravitational sensors separate from the roller 222. The gravitational system can tune the gravitational sensor array (see sensor array 110 of FIG. 1) to such a signal, e.g., to measure signals in a narrow bandwidth while attenuating other frequencies or noise outside the narrow desired bandwidth.

Figure 3:
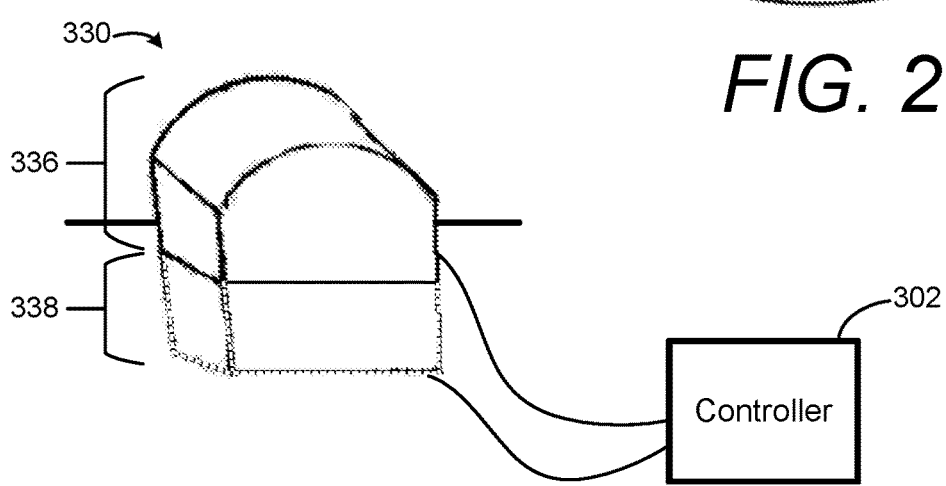
FIG. 3 illustrates a sensor element coupled to a controller according to an embodiment.

FIG. 3 illustrates a sensor element 330 coupled to a controller 302 according to an embodiment. The sensor element 330 includes a sensing first portion 336, and an actuating second portion 338, coupled to the controller 302. The sensing first portion 336 is illustrated as extending above a surface in which it is mounted (e.g., mounted in the surface of a roller or turntable), and the actuating second portion 338 is illustrated as extending below the surface. The controller 302 can also be coupled to supporting components to facilitate interactions with the various sensor array and sensor elements, such as force or weight sensor electronics and force driver or control electronics.

Figure 4:
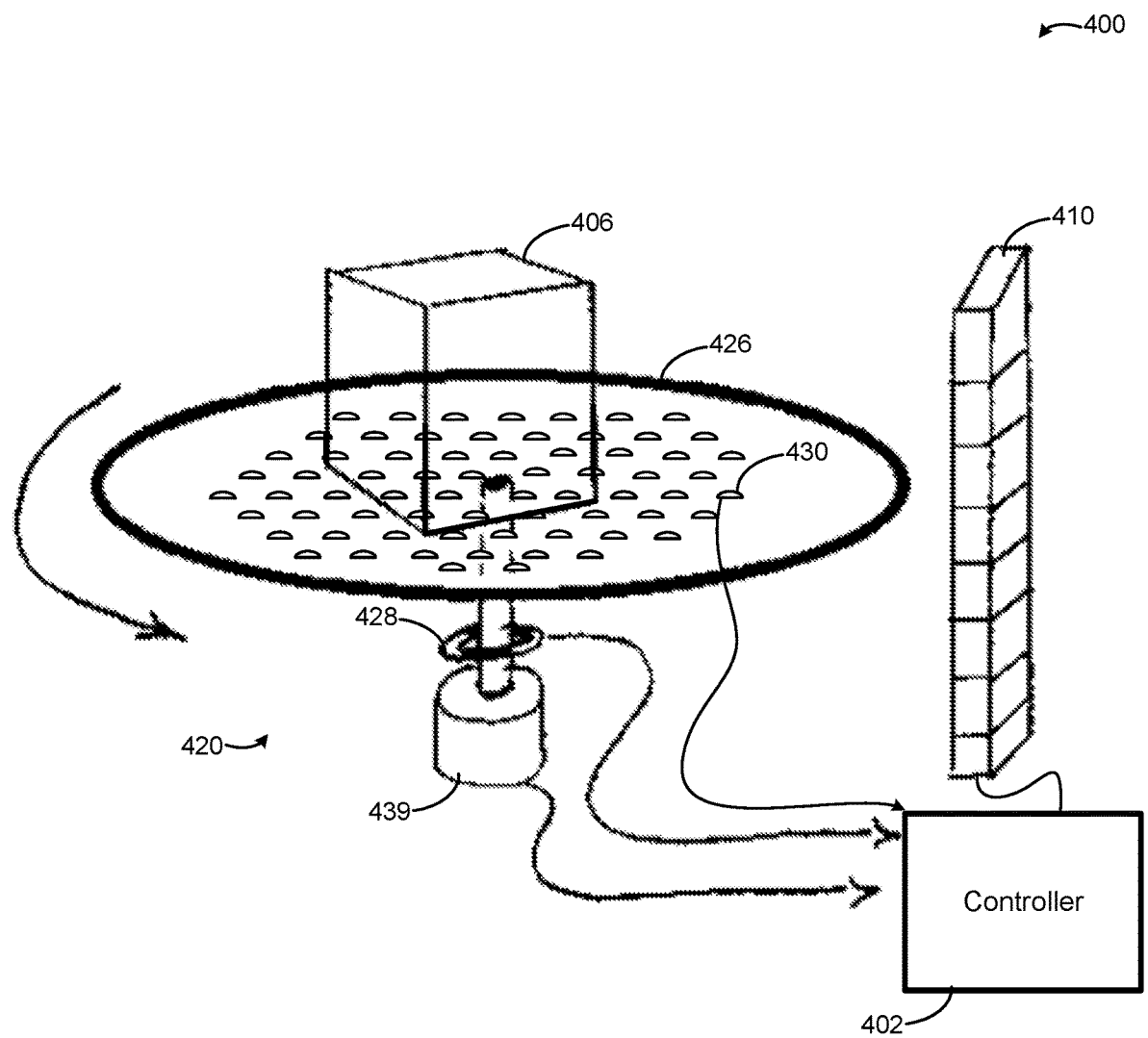
FIG. 4 illustrates a system including a sensor array and a turntable conveyor with sensor elements according to an embodiment.

FIG. 4 illustrates a system 400 including a sensor array 410 and a turntable conveyor 420 with sensor elements 430 according to an embodiment. The sensor array 410 and conveyor 420 are coupled to controller 402, to sense item 406. The conveyor 420 includes a turntable 426, a plurality of sensor elements 430, a rotational sensor 428, and a support sensor element 439. The rotational sensor 428 can be provided as, e.g., a shaft encoder or other circuitry. The sensor elements 430 and support sensor element 439 can sense and actuate, to impart an impulse to the item 406 and detect return pulses from the item 406. The support sensor element 439 also can include a motor or gearbox to facilitate rotation and actuation of the turntable 426. The controller 402 can be coupled to additional elements such as data acquisition, motor control, power, and processing electronics.

In some cases, the items 406 undergoing inspection may be too large for transport on a conveyor through a fixed aperture, such as the aperture of an X-ray system of the inspection areas for baggage or break bulk cargo inspection. To address such items, embodiments include a large-application gravitational system to accept large items. The system 400 of FIG. 4 illustrates a large-application embodiment, including a stand-alone turntable. The turntable can be mounted on a central axle as illustrated. In another embodiment, the turntable can be supported along some or all of its circumference, similar to a lazy Susan turntable having bearings toward an outer edge of the turntable. Embodiments thereby enable large diameters of the turntable, suitable as needed to accommodate very large items of arbitrarily large dimensions otherwise incompatible with aperture-style scanners.

In the turntable embodiment of FIG. 4, the gravitational sensor array 410 is employed as gravity accelerometers mounted in a fixed array or movable array adjacent to the turntable 426 on which the item 406 under test would be supported. In an embodiment, the gravitational sensor array 410 is mounted on an actuated arm (see the actuated mount 716 of FIG. 7), which can move the gravitational sensor array 410 closer to or farther from an axis of rotation of the turntable 426, to accommodate different sized items 406.

The gravitational system 400 tracks the orientation of the rotating turntable 426 and item 406 relative to the gravitational sensor array 410. In an embodiment, the gravitational system 400 monitors the turntable operations using a turntable motor encoder or a shaft encoder at the rotational sensor 428 or support sensor element 439. The encoder allows the controller 402 to synchronize the collection of data from the gravitational sensor array 410 (e.g., gravity sample mass sensors) with the turntable 426 operations. The gravitational system 400 produces a tomographic-like data set of the gravity field originating from the item 406, based on the rotation of the item 406 on the turntable 426 while sensing with the gravitational sensor array 410.

The gravitational system 400 also performs additional sensing and can impart impulses to the item 406 carried by the turntable 426. In an embodiment, the turntable 426 is fitted with a plurality of turntable sensor elements 430 disposed in a surface of the turntable 426, similar to the roller sensor elements of other embodiments. The turntable sensor elements 430 can perform sensing operations and actuation operations. The turntable sensor elements 430 can be mounted so their upper surface is flush with the turntable surface. The turntable sensor elements 430 also can be mounted so their upper surface protrudes from the turntable surface. Similar to the roller sensor elements, upper surfaces of the turntable sensor elements 430 can be arcuate, flat, pointed, concave, convex, or can have other surface configurations.

The turntable sensor elements 430 can perform sensing and actuation similar to roller sensor elements of other embodiments, e.g., performing actuation using a cam and pushrod system or other mechanical configuration, or using electrical actuation. In an embodiment, the gravitational system 400 imparts an impulse to the item 406 by actuating the entire turntable 426 via the turntable's axis of rotation, with sensors on the axis to sense reactions of the turntable 426 to the impulse on the item 406. Embodiments can combine the use of sensors and actuators on the turntable axis with the use of sensors and actuators on one or more turntable sensor elements 430 disposed on the turntable 426 to sense or actuate the item 406 placed on the turntable 426.

Similar to the roller embodiments, the turntable embodiments of the gravitational system 400 can include different types or configurations of the gravitational sensor array 410, including moving the gravitational sensor array 410 to perform sensing from different angles, providing gravitational sensor arrays having arcs or loops, or other geometries. The turntable embodiments also can similarly use stop-and-go approaches to stop or rotate the turntable 426, or stop or actuate the turntable sensor elements 426 or gravitational sensor array 410, to perform measurements or impart impulses to the item 406 whether the item 406 or the components of the system 400 are in motion or stopped.

Figure 5:
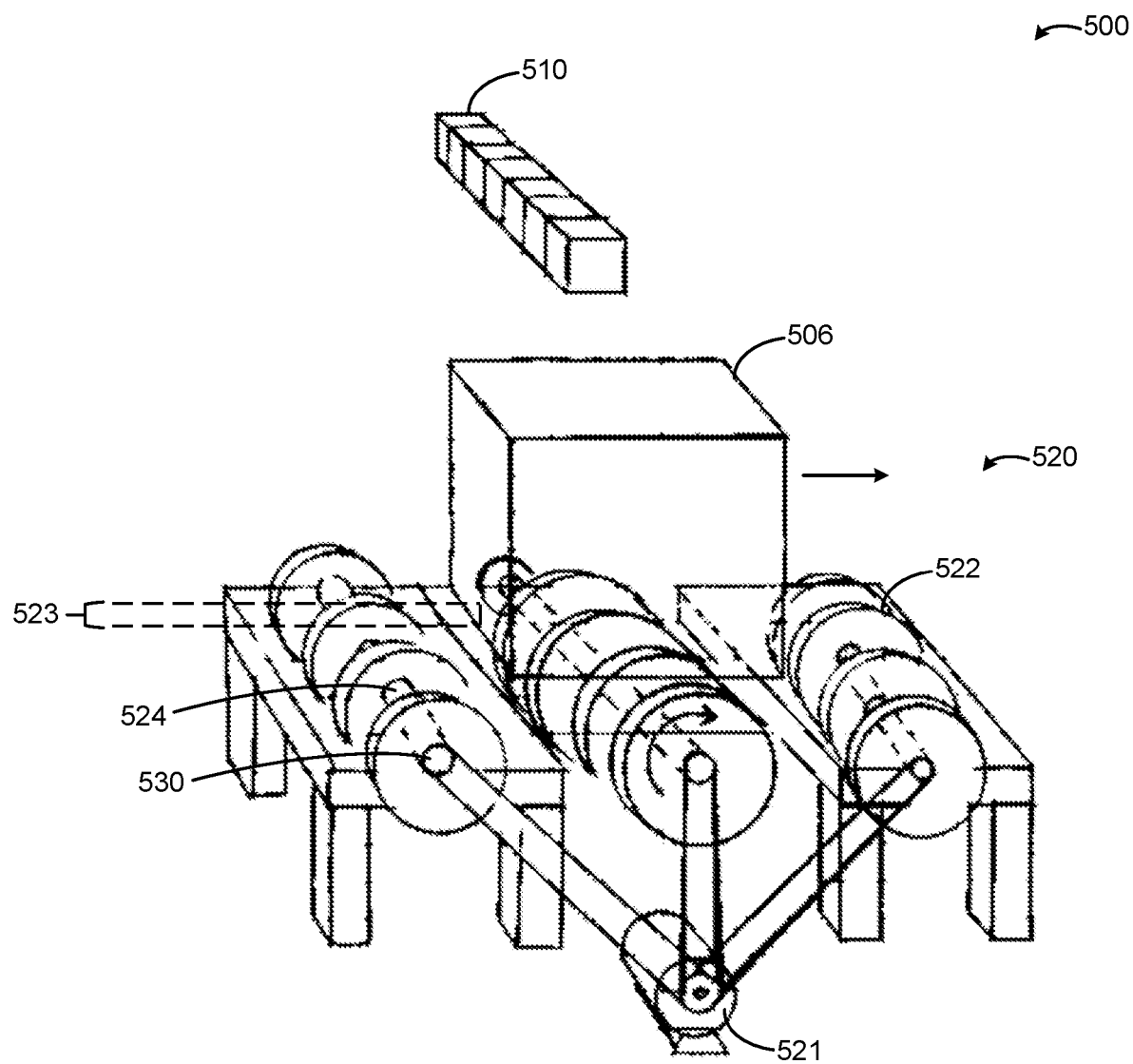
FIG. 5 illustrates a system 500 including a sensor array and a disc roller conveyor according to an embodiment.

FIG. 5 illustrates a system 500 including a sensor array 510 and a disc roller conveyor 520 according to an embodiment. Such an overall operational concept enables the system 500 to perform inertial impulse and gravimetric inspection of the item 506 being conveyed along linear travel without a conveyor belt. The conveyor 520 conveys item 506 using a plurality of disc-shaped rollers 522 that are arranged as discs along a plurality of axles 524. The sensor array 510 is a linear array of sensors, which may be gravitational field sensors, gravimeters, gradiometers, accelerometers, or the like arranged in an element array. A plurality of sensor elements 530 are arranged at the plurality of axles 524 to sense forces from and impart impulses to the rollers 520 via the axles 524. A motor 521 drives the plurality of rollers 522. The rollers 522 are spring loaded vertically by virtue of the sensor elements 530. The rollers 522 are arranged with a vertical offset 523, relative to a plane of motion along which the conveyor 520 conveys the item 506. The various components may be coupled to a controller, such as controller 102 shown in FIG. 1, which facilitates operations of the system 500 including power, signaling, positional information, measurement data, and the like.

A given roller 522 rotates about an axle 524, which is fitted with sensors or actuators such as sensor elements 530. Such sensor elements 530 enable the gravitational system 500 to weigh the item 506 or impart additional upward impulse via the roller 522 to the item 506. The plurality of rollers 522 can be arranged as multiple discs having individual independent axles 524. The width of a disc corresponds to a pixel, with multiple discs providing a pixel resolution along the direction of an axis of rotation of the rollers 522 (e.g., having a pixel resolution corresponding to a width of the rollers 522 whose interactions are tracked by their corresponding sensor elements 530). The roller 522 can sense a weight or mass measurement continuously, through multiple rotations of the roller 522 as the item 506 passes over the roller 522, based on the effect of gravity on the item's mass. Multiple rollers 522 can provide multiple measurements or impart multiple impulses to the item 506 in parallel, for a parallel scanning action corresponding to multiple translation functions in parallel. In an embodiment, the system 500 can include sensor elements 530 on surfaces of the rollers 522, in addition to or as an alternative to the sensor elements 530 at the axles of the rollers 522. Such roller sensor elements 530 operate as discussed above with respect to the sensor elements illustrated in FIG. 2.

Figure 6:
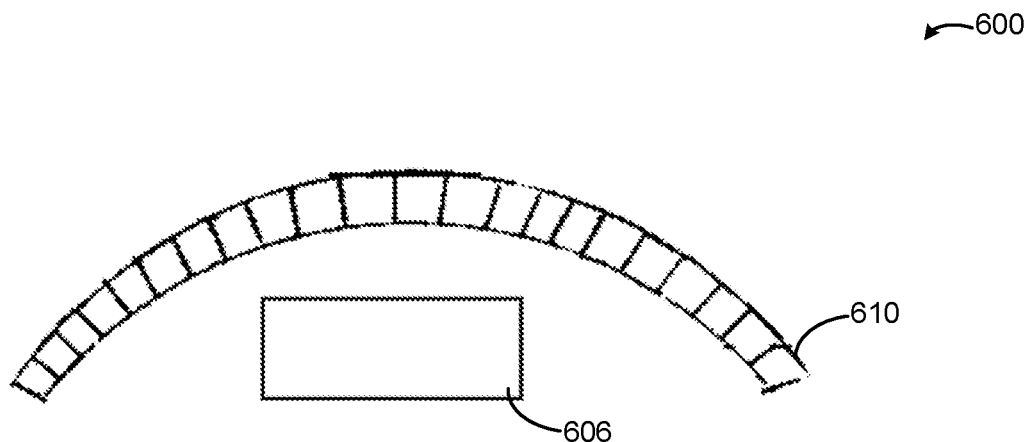
FIG. 6 illustrates a curved sensor array according to an embodiment.

FIG. 6 illustrates a curved sensor array 610 according to an embodiment. The curved sensor array 610 senses a gravitational field caused by the item 606. The curved sensor array 610 also may be described as curvilinear. Because the sensor array 610 of gravitational sensors is curved around at least a portion of the item being conveyed, the curved sensor array 610 enables sensing of multiple angles of the item 606. This enables such systems to sense features of the item 606 from additional angles beyond the illustrated overhead linear sensor array configuration of other embodiments.

The curved sensor array 610 of gravitational sensors may be configured to take measurements from additional angles or side angles. The additional angles enable the gravitational system to, in effect, generate images based on additional circular slices of data based on gravitational sensing. In such sensing, the gravitational system uses the sensed data to generate gravitational tomograph-like image "slices" of the item undergoing inspection, and assemble the slices together into images of the item 606. The gravitational system processes the collected data akin to an X-ray CAT scan, used in medical or aviation security baggage screening, but based on gravity instead of X-rays. The gravitational system 600 acquires, converts, and processes such data and input streams, including data and input streams from other sensors including the weight map and the dynamic acceleration map of the base of the item 606 as sensed by sensor elements. The resulting tomographic image provides a measurement and image of the mass density of the item 606 under inspection.

Figure 7:
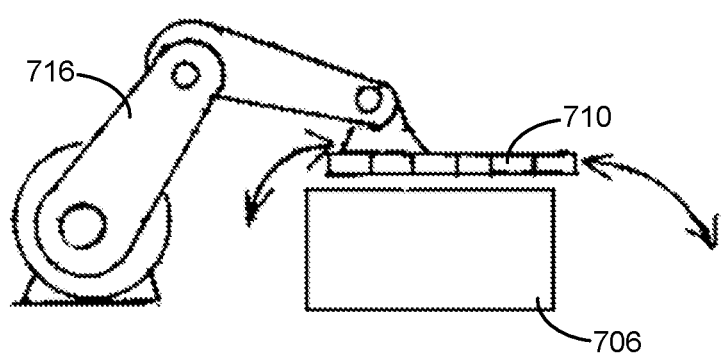
FIG. 7 illustrates a sensor array with an actuated mount according to an embodiment.

FIG. 7 illustrates a sensor array 710 with an actuated mount 716 according to an embodiment. A linear sensor array 710 is shown coupled to the actuated mount 716. In other embodiments, the sensor array 710 can be curved or formed in geometries other than the illustrated linear arrangement. The actuated mount 716 may include an actuator, translator, motor, robotic arm, or other mechanics to facilitate moving and reorienting the sensor array 710. The sensor array 710 and the actuated mount 716 can be coupled to a controller such as controller 102 of FIG. 1, and other supporting elements such as sensors, power, signal processing, and control electronics. The actuated mount 716 is illustrated as being articulated in various joints. The articulated mount 716 may be configured to allow six degrees of freedom to articulate the sensor array 710 with full freedom of movement and orientation.

The sensor array 710 of gravitational sensors is movable using an actuated mount 716 that allows the gravitational system to move the gravitational sensor array 710. The gravitational system can actuate the gravitational sensor array 710 to move from side-to-side or up-and-down or forward-and-backward and so on, to take gravitational field measurements and gravity gradient measurements from additional angles. In another embodiment, one or more sensor arrays 710 are disposed on the movable support. The movable support 710 actuates the sensor arrays 710, e.g., to rock back and forth or otherwise reposition relative to the item 706 undergoing scanning, to get different views of the item 706 being scanned while keeping production costs low by using relatively fewer sensor arrays 710 to cover more sensing angles and positions. Embodiments can obtain different sensing configurations by mechanically actuating the sensor arrays 710. As discussed above, embodiments also can mount the sensor arrays 710 to tracks that move the sensor arrays 710 along different paths and orientations.

Figure 8:
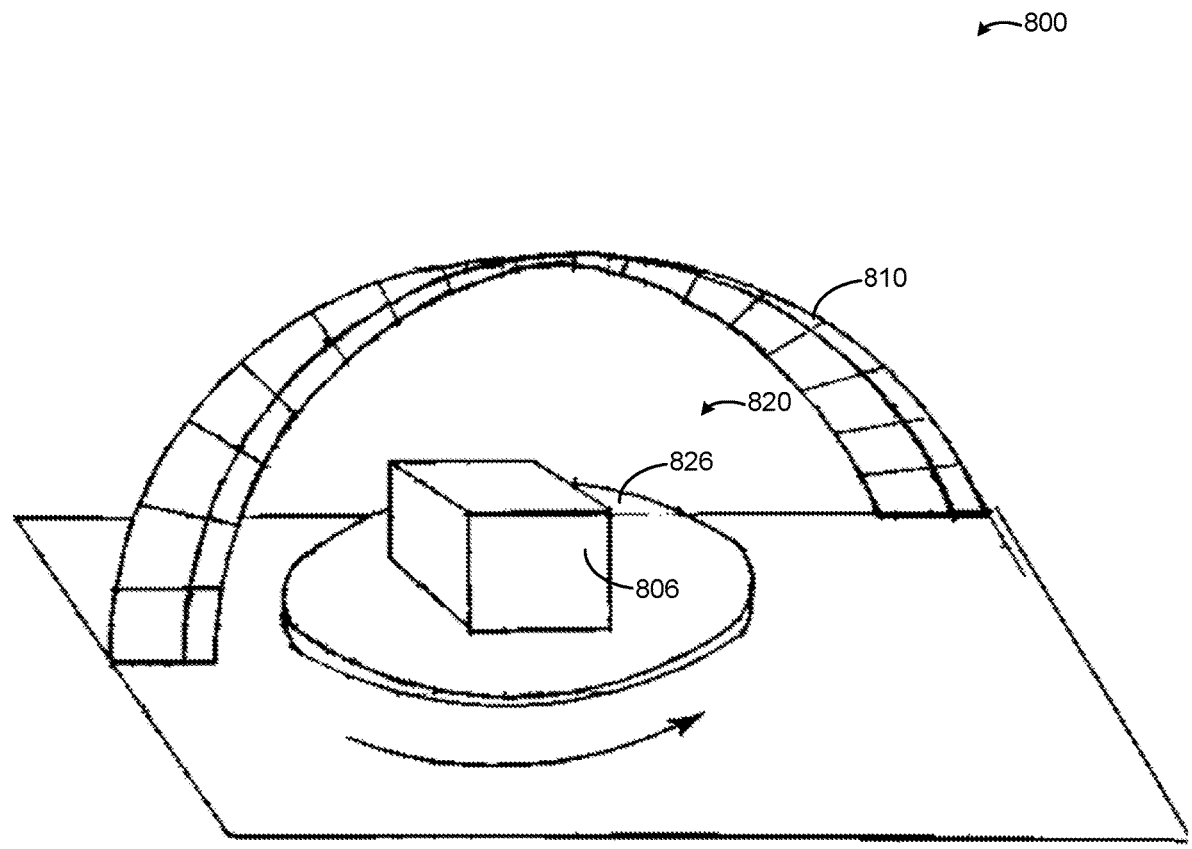
FIG. 8 illustrates a system including a curved sensor array and a turntable conveyor according to an embodiment.

FIG. 8 illustrates a system including a curved sensor array 810 and a turntable conveyor 820 according to an embodiment. The conveyor 820 includes a turntable 826 to rotate the item 806 for sensing by the sensor array 810. The various components may be coupled to a controller, such as controller 102 shown in FIG. 1, which facilitates operations of the system 800 including power, signaling, positional information, measurement data, and the like. The combination of turntable and curved sensor array 810 enables the system 800 to sense multiple angles of the item 806 and obtain slices of the item 806 from multiple angles simultaneously.

Figure 9:
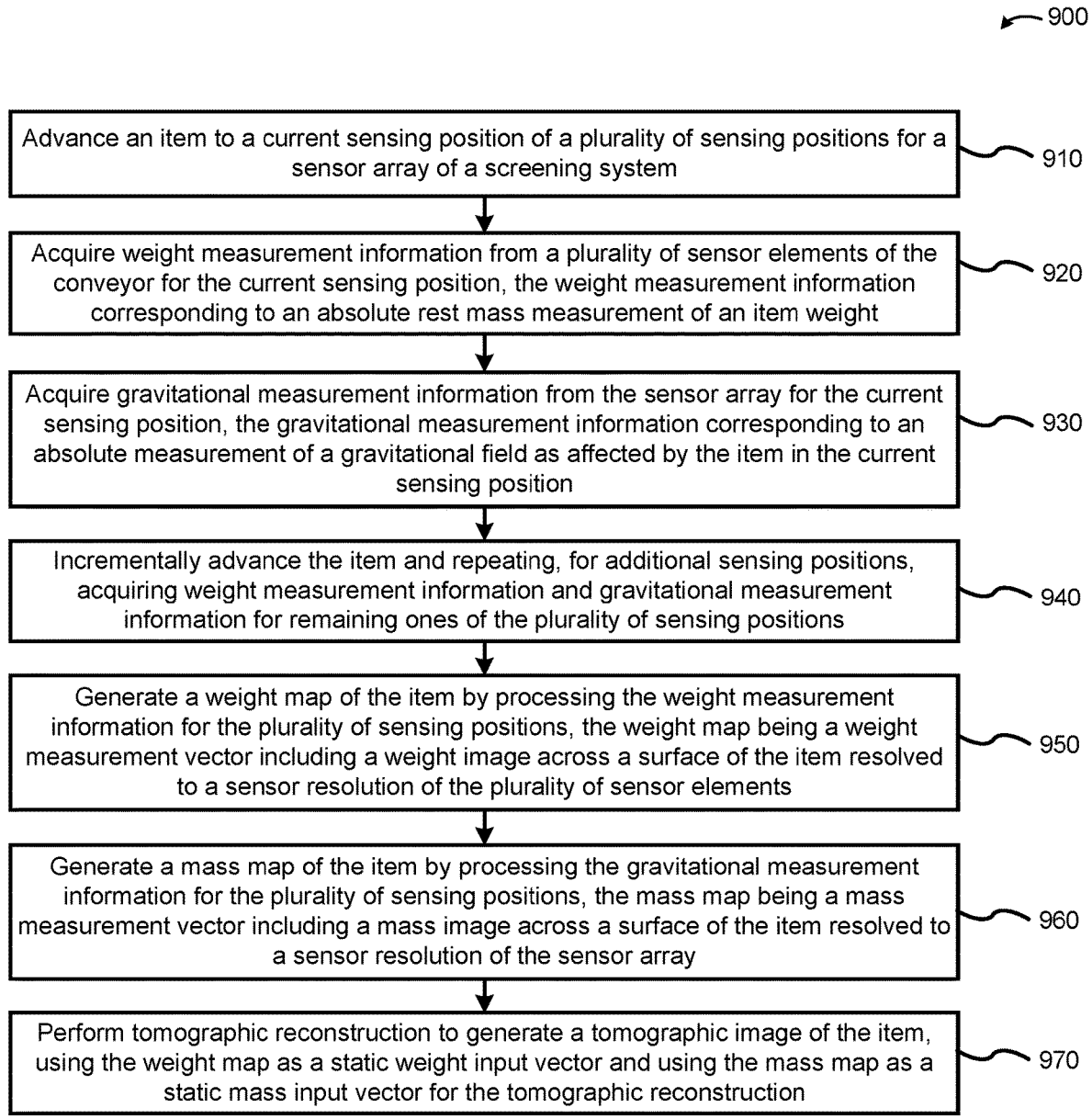
FIG. 9 illustrates a method of generating a tomographic image of an item according to an embodiment.

FIG. 9 illustrates a method 900 of generating a tomographic image of an item according to an embodiment. At 910, a conveyor advances an item to a current sensing position of a plurality of sensing positions for a sensor array of a screening system. For example, a roller coupled to a stepper motor rotates to advance the item incrementally. At 920, a controller acquires weight measurement information from a plurality of sensor elements of the conveyor for the current sensing position. The weight measurement information corresponds to an absolute rest mass measurement of an item weight. For example, the roller includes sensor elements arranged along its surface, to sense the item to detect its weight and a geometry of its footprint. The sensor elements detect individual contributions of weight from multiple points across the footprint of the item. At 930, the controller acquires gravitational measurement information from the sensor array for the current sensing position. The gravitational measurement information corresponds to an absolute measurement of a gravitational field as affected by the item in the current sensing position. For example, a sensor array of multiple accelerometers sense individual gravitational contributions to the gravitational field across multiple areas of the item. At 940, the controller incrementally advances the item and repeats, for additional sensing positions, acquiring weight measurement information and gravitational measurement information for remaining ones of the plurality of sensing positions. For example, the controller directs a stepper motor of the roller to incrementally advance the roller, correlating the incremental advancement of the roller to a corresponding incremental advance of the item past the sensor array. The controller also correlates the incremental advancement to which sensor elements on the roller are oriented to be in contact with the item, or are positioned to apply an impulse or sense a return impulse from the item. At 950, the controller generates a weight map of the item by processing the weight measurement information for the plurality of sensing positions. The weight map is a weight measurement vector including a weight image across a surface of the item resolved to a sensor resolution of the plurality of sensor elements. For example, the controller assembles the contributions from the plurality of sensing positions as obtained when incrementally advancing the roller and sensing the item via the sensor array and the sensor elements. At 960, the controller generates a mass map of the item by processing the gravitational measurement information for the plurality of sensing positions. The mass map is a mass measurement vector including a mass image across a surface of the item resolved to a sensor resolution of the sensor array. At 970, the controller performs tomographic reconstruction to generate a tomographic image of the item, using the weight map as a static weight input vector and using the mass map as a static mass input vector for the tomographic reconstruction. For example, the controller uses tomographic reconstruction software to process the output from the sensor array and the sensor elements.

Figure 10:
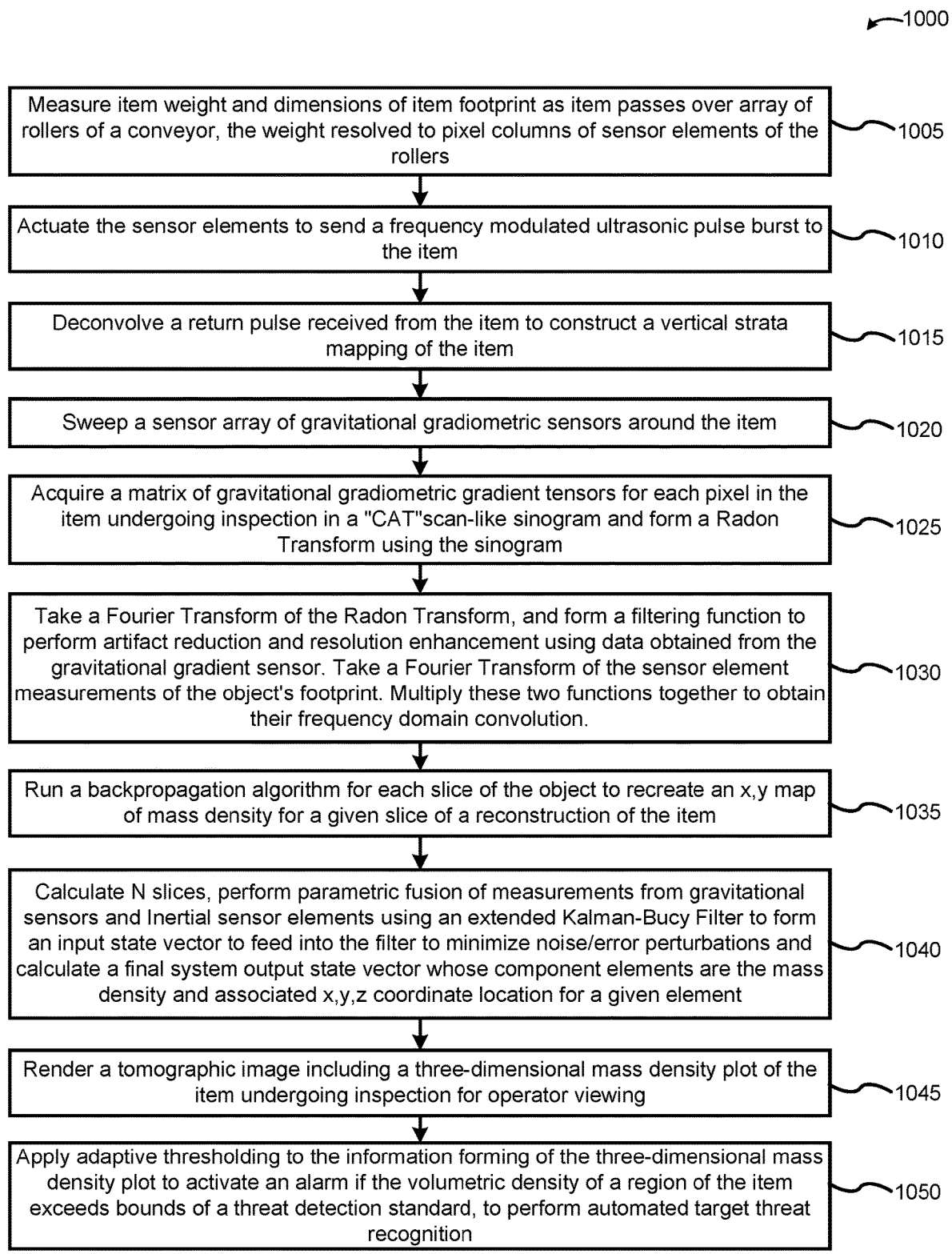
FIG. 10 illustrates a method of selectively activating an alarm based on a three-dimensional mass density plot of an item according to an embodiment.

FIG. 10 illustrates a method 1000 of selectively activating an alarm based on a three-dimensional mass density plot of an item according to an embodiment.

At measurement 1005, a controller measures an item weight and dimensions of an item footprint as the item passes over array of rollers of a conveyor. The controller resolves the weight to pixel columns of sensor elements of the rollers. In an embodiment, the controller directs the conveyor to load the item onto the conveyor and move the item over an array of roller discs. As the item passes over roller disc elements, the controller measures weight and dimensions of a footprint of the item as the item passes over the rollers. Thus, the controller measures the weight of each pixel column of the item passing over each roller element.

At actuation 1010, the controller actuates the sensor elements to send a frequency modulated ultrasonic pulse burst to the item. For example, the controller sends a frequency modulated ultrasonic pulse burst up through one or more sensor elements.

At deconvolution 1015, the controller receives and deconvolves a return pulse received from the item. The controller constructs a vertical stratum mapping of each item that interacts with each sensor element.

At sweeping 1020, the controller sweeps a sensor array of gravitational gradiometric sensors around the item. For example, the conveyor can use a curved sensor array to sense the item without moving the sensor array. The conveyor can move or rotate the item (e.g., using a turntable) to expose multiple angles and positions of the item to the sensor array. The conveyor can use a movable sensor array, e.g., mounted to an actuated mount, to reorient the sensor array without moving the item. Embodiments can use various combinations of sensor geometries, sensor mounts, and item conveyors to fully sense the item using the sensor array.

At acquisition 1025, the controller acquires a matrix of gravitational gradiometric gradient tensors for each pixel in the item undergoing inspection in a "CAT" scan-like sinogram, which the controller uses to form a Radon Transform.

At transformation 1030, the controller takes a Fourier Transform of the Radon Transform, and forms a filtering function to perform artifact reduction and resolution enhancement using data obtained from the gravitational gradient sensor array. The controller takes a Fourier Transform of the sensor element measurements of the object's footprint. The controller multiplies these two functions together to obtain their frequency domain convolution.

At backpropagation 1035, the controller runs a backpropagation algorithm for each slice of the object to recreate an x,y map of mass density for a given slice of a reconstruction of the item.

At calculation 1040, the controller calculates N slices, and performs parametric fusion of measurements from the gravitational sensor array and the inertial roller sensor elements, using an extended Kalman-Bucy Filter to fuse the various inputs from the sensor array and sensor elements to form an input state vector to feed into the filter to minimize noise or error perturbations and calculate a final system output state vector whose component elements are the mass density and associated x,y,z coordinate location of the element.

At rendering 1045, the controller renders (e.g., using 3D plotting software) a tomographic image including a three-dimensional mass density plot of the item undergoing inspection. The controller can display the tomographic image for operator viewing, and can overlay colors or other pertinent information for the operator to consider.

At automated target threat recognition 1050, the controller applies adaptive thresholding to the information forming the three-dimensional mass density plot to activate an alarm if, e.g., the volumetric density of a region of the item exceeds bounds of a threat detection standard, to perform automated target threat recognition. In other embodiments, the controller can apply adaptive thresholding in this manner to confirm or disconfirm an automated X-ray threat alarm or shield alarm of the item (e.g., where the item alarms in an X-ray machine and the controller determines whether the X-ray alarm is a false alarm).

While a number of embodiments of the present subject matter have been described, it should be appreciated that the present subject matter provides many applicable inventive concepts that can be embodied in a wide variety of ways. The embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:
1. A screening system comprising:
 a sensor array to sense a gravitational field caused by an item;
 a conveyor configured to convey the item through a plurality of sensing positions for scanning by the sensor array; and
 a controller configured to:
  direct the conveyor to advance the item to a current sensing position of a plurality of sensing positions for the sensor array;
  acquire gravitational measurement information from the sensor array for the current sensing position, the gravitational measurement information corresponding to an absolute measurement of a gravitational field as affected by the item in the current sensing position;

incrementally advance the item and repeat, for additional sensing positions, acquiring gravitational measurement information for remaining ones of the plurality of sensing positions;

generate a mass map of the item by processing the gravitational measurement information for the plurality of sensing positions, the mass map being a mass measurement vector including a mass image across a surface of the item resolved to a sensor resolution of the sensor array; and perform tomographic reconstruction to generate a tomographic image of the item, using the mass map as a static mass input vector for the tomographic reconstruction.

2. The screening system of claim 1, wherein the controller is further configured to use the tomographic image of the item as actionable data corresponding to an internal composition of shielded contents, to confirm or disconfirm an automated X-ray threat alarm or shield alarm of the item.

3. The screening system of claim 1, wherein the conveyor comprises one or more rollers and a plurality of sensor elements disposed on corresponding one or more surfaces of the one or more rollers.

4. The screening system of claim 3, wherein a given sensor element is disposed on a given roller of the one or more rollers to include a first portion of the given sensor element below a surface of the given roller, and a second portion of the given sensor element above the surface of the given roller.

5. The screening system of claim 3, wherein a given sensor element is disposed on a given roller of the one or more rollers to include a portion of the given sensor element flush with a surface of the given roller.

6. The screening system of claim 1, wherein the conveyor comprises a plurality of rollers and a plurality of sensor elements disposed to sense forces and displacements of the plurality of rollers via a plurality of axles corresponding to the plurality of rollers.

7. The screening system of claim 6, wherein at least one roller of the plurality of rollers is spring-loaded and positioned at an offset relative to a plane of motion of the item, to passively impart an impulse to the item responsive to the roller displacing the item by the offset when the item comes in contact with the at least one roller.

8. The screening system of claim 1, the conveyor further comprising a plurality of sensor elements actuatable to impart an impulse to the item, the controller further configured to:

direct the conveyor to advance the item to the current sensing position for the sensor array;

actuate at least one of the plurality of sensor elements to apply at least a portion of the impulse to the item, a given one of the plurality sensor elements imparting a force to a given pixel mass element corresponding to a given coordinate on a base surface of the item interacting with the given sensor element;

acquire feedback information from the plurality of sensor elements for the current sensing position, the feedback information including force information and displacement information corresponding to a return pulse from the item responsive to applying at least a portion of the impulse to the item;

incrementally advance the item and repeat, for additional sensing positions, acquiring feedback information for remaining ones of the plurality of sensing positions;

generate a dynamic acceleration map and an inertial mass map of the item by processing the force information and displacement information for the plurality of sensing positions, the dynamic acceleration map being a dynamic acceleration measurement vector of the item and the inertial mass map being a dynamic acceleration measurement vector of the item, corresponding to a surface of the item interacting with the plurality of sensor elements; and perform tomographic reconstruction to generate the tomographic image of the item, using the dynamic acceleration map as a dynamic acceleration input vector and using the inertial mass map as an inertial mass input vector for the tomographic reconstruction.

9. The screening system of claim 8, the controller being further configured to:

actuate, for the current sensing position, the at least one of the plurality of sensor elements at a series of different acceleration levels; and collect a series of feedback information corresponding to a resulting series of return pulses from the item.

10. The screening system of claim 8, wherein the conveyor comprises a roller, and the plurality of sensor elements are arranged on the roller spaced apart such that rotation of the roller at an operational speed brings the plurality of sensor elements into contact with the item to impart the impulse according to a regular periodic function, and the controller is further configured to identify and subtract out a corresponding carrier signal from the sensor array.

11. The screening system of claim 10, wherein the regular periodic function comprises a 5 Hz rate of the sensor elements contacting the item to impart the impulse.

12. The screening system of claim 8, wherein the plurality of sensor elements are electrically actuated solenoids including piezoelectric elements for sensing.

13. The screening system of claim 8, further comprising a rotational sensor to identify a position of the conveyor, the controller further configured to correlate the position of the conveyor to a position of a given one of the plurality of sensor elements ready to apply the impulse to a given area of the item, and actuate the given one of the plurality of sensor elements based on correlating the position.

14. The screening system of claim 1, wherein the sensor array comprises an array of gravimetric accelerometers.

15. The screening system of claim 1, wherein the sensor array includes a plurality of gravimeters.

16. The screening system of claim 1, wherein the sensor array includes a plurality of gravity gradiometers.

17. The screening system of claim 1, wherein the sensor array is curved to sense features of the item from multiple different angles, corresponding to curvature of the sensor array.

18. The screening system of claim 1, further comprising an actuated mount that supports the sensor array, wherein the controller is further configured to direct the actuated mount to move and reorient the sensor array to different distances, positions, and angles relative to the conveyor to sense the item.

19. The screening system of claim 1, wherein the sensor array comprises a plurality of phased array static sensors that are electronically switched to cover a plurality of sensing angles and positions.

20. The screening system of claim 1, wherein the conveyor is a rotating turntable, the controller further configured to track an orientation of the rotating turntable conveying the item relative to the sensor array.

21. The screening system of claim 20, further comprising a rotational sensor, wherein the controller is further configured to:

monitor turntable operations including turntable position and turntable rotation via the rotational sensor, and synchronize collection of data from the sensor array to correspond with the turntable operations.

22. The screening system of claim 20, wherein the conveyor further comprises a plurality of sensor elements including a support sensor element coupled to a support of the turntable, and sensor elements along a surface of the turntable, the controller further configured to direct the support sensor element to impart an impulse to the entire turntable and sense feedback from the support sensor element and the sensor elements along the surface of the turntable.

23. A method for scanning an item, comprising:
directing, by a controller of a screening system, a conveyor of the screening system to advance an item to a current sensing position of a plurality of sensing positions for a sensor array of the screening system;
acquiring gravitational measurement information from the sensor array for the current sensing position, the gravitational measurement information corresponding to an absolute measurement of a gravitational field as affected by the item in the current sensing position;
incrementally advancing the item and repeating, for additional sensing positions, acquiring gravitational measurement information for remaining ones of the plurality of sensing positions;
generating a mass map of the item by processing the gravitational measurement information for the plurality of sensing positions, the mass map being a mass measurement vector including a mass image across a surface of the item resolved to a sensor resolution of the sensor array; and
performing tomographic reconstruction to generate a tomographic image of the item, using the mass map as a static mass input vector for the tomographic reconstruction.

24. The method of claim 23, further comprising:
directing the conveyor to advance the item to the current sensing position for the sensor array;
actuating at least one of a plurality of sensor elements of the conveyor to apply at least a portion of an impulse to the item, a given one of the plurality of sensor elements imparting a force to a given pixel mass element corresponding to a given coordinate on a base surface of the item interacting with the given sensor element;
acquiring feedback information from the plurality of sensor elements for the current sensing position, the feedback information including force information and displacement information corresponding to a return pulse from the item responsive to applying at least a portion of the impulse to the item;
incrementally advancing the item and repeating, for additional sensing positions, acquiring feedback information for remaining ones of the plurality of sensing positions;
generating a dynamic acceleration map and an inertial mass map of the item by processing the force information and displacement information for the plurality of sensing positions, the dynamic acceleration map being a dynamic acceleration measurement vector of the item and the inertial mass map being a dynamic acceleration measurement vector of the item, corresponding to a surface of the item interacting with the plurality of sensor elements; and
performing tomographic reconstruction to generate the tomographic image of the item, using the dynamic acceleration map as a dynamic acceleration input vector and using the inertial mass map as an inertial mass input vector for the tomographic reconstruction.

25. The method of claim 24, further comprising applying at least the portion of the impulse as a frequency modulated ultrasonic pulse burst.

26. The method of claim 24, wherein performing tomographic reconstruction comprises applying a custom sensor fusion reconstruction algorithm to accept input vectors corresponding to information collected from the sensor elements of the conveyor sensing physical interactions with the item, and collected from the sensor array sensing gravitational effects caused by the item, to obtain density attenuation information for a plurality of points representing the item in a coordinate system.

27. The method of claim 23, wherein the item has previously triggered an X-ray scanning shield alarm flagging at least a portion of the item as being shielded from X-rays, the method further comprising confirming whether the shield alarm is a false alarm by using tomographic reconstruction to reveal an internal composition of shielded contents otherwise obscured when X-ray scanning.

28. A screening system comprising:
a conveyor actuatable to impart an impulse to the item, the conveyor configured to convey the item through a plurality of sensing positions; and
a controller configured to:
direct the conveyor to advance the item to a current sensing position of a plurality of sensing positions;
actuate the conveyor to apply at least a portion of an impulse to the item;
acquire feedback information from the conveyor for the current sensing position, the feedback information including force information and displacement information corresponding to a return pulse from the item responsive to applying at least a portion of the impulse to the item;
incrementally advance the item and repeat, for additional sensing positions, acquiring feedback information for remaining ones of the plurality of sensing positions;
generate a dynamic acceleration map and an inertial mass map of the item by processing the force information and displacement information for the plurality of sensing positions, the dynamic acceleration map being a dynamic acceleration measurement vector of the item and the inertial mass map being a dynamic acceleration measurement vector of the item, corresponding to a surface of the item interacting with the plurality of sensor elements; and
perform tomographic reconstruction to generate the tomographic image of the item, using the dynamic acceleration map as a dynamic acceleration input vector and using the inertial mass map as an inertial mass input vector for the tomographic reconstruction.

* * * * *